(12) United States Patent  (10) Patent No.: US 8,547,655 B2
Aoyama et al.  (45) Date of Patent: Oct. 1, 2013

(54) MAGNETIC RECORDING METHOD USING MICROWAVE ASSISTED HEAD

(75) Inventors: Tsutomu Aoyama, Tokyo (JP); Hiroshi Ikeda, Tokyo (JP); Isamu Sato, Tokyo (JP)

(73) Assignee: TDK Corporation, Tokyo (JP)

( * ) Notice: Subject to any disclaimer, the term of this patent is extended or adjusted under 35 U.S.C. 154(b) by 145 days.

(21) Appl. No.: 13/297,377

(22) Filed: Nov. 16, 2011

(65) Prior Publication Data

US 2012/0127610 A1 May 24, 2012

(30) Foreign Application Priority Data

Nov. 19, 2010 (JP) ................................ 2010-258711

(51) Int. Cl.
*G11B 5/02* (2006.01)
(52) U.S. Cl.
USPC .............................................. 360/27; 360/29
(58) Field of Classification Search
None
See application file for complete search history.

(56) References Cited

U.S. PATENT DOCUMENTS 6,785,092 B2   8/2004  Covington et al.

FOREIGN PATENT DOCUMENTS

| JP | 2000-269899 A | 9/2000 |
|----|---------------|--------|
| JP | 2001-268163 A | 9/2001 |
| JP | 2007-299460 A | 11/2007 |
| JP | 2010-003399 A | 1/2010 |
| JP | 2010-073286 A | 4/2010 |
| JP | 2010-182347 A | 8/2010 |

*Primary Examiner* — Paul Huber
(74) *Attorney, Agent, or Firm* — Posz Law Group, PLC

(57) ABSTRACT

A magnetic recording method for a recording layer of a magnetic recording medium uses a thin film magnetic head with a sub-coil or a microwave radiator. In the method, a microwave spread spectrum (SS) signal is applied to the sub-coil or the microwave radiator, the microwave SS signal including a ferromagnetic resonant (FMR) frequency of the recording layer as a carrier wave within a band so as to generate an in-plane high-frequency magnetic field so that a magnetization reversal magnetic field Hsw of the recording layer is lowered. The magnetic recording is performed while the magnetization reversal magnetic field Hsw of the recording layer is lowered.

11 Claims, 29 Drawing Sheets

MAGNETIC RECORDING METHOD USING MICROWAVE ASSISTED HEAD

CROSS REFERENCE TO RELATED APPLICATION

The present application is related to, claims priority from and incorporates by reference Japanese patent application No. 2010-258711, filed on Nov. 19, 2010.

BACKGROUND OF THE INVENTION

1. Field of the Invention

The present invention relates to a magnetic recording method using a microwave assisted head for writing a data signal to a magnetic recording medium having a large coercive force to stabilize a magnetization.

2. Description of the Related Art

Bit cells of digital information recorded to a magnetic recording medium are miniaturized with developments in high density recording. As a result, signals detected from a reproduction element of a magnetic head may fluctuate due to a so-called thermal fluctuation so that signal-to-noise ratio (S/N) may be deteriorated or, in the worst case, the signal may be lost.

For this reason, in a magnetic recording medium that utilizes a perpendicular recording system, which has been put to practical use in recent years, miniaturizing magnetic nanoparticles that configure a recording layer simultaneously with increasing magnetic anisotropy energy Ku that fixes the magnetization direction of the magnetic nanoparticles are effective in order to solve the above problems. A thermal stability index S that corresponds to the thermal fluctuation is expressed by $S = Ku \cdot V/kB \cdot T$, and it is said that the value of S is generally required to be not less than 50. Here, Ku is magnetic anisotropy energy, V is the volume of magnetic nanoparticles that configure the recording layer, kB is the Boltzmann constant, and T is the absolute temperature.

However, a magnetic field (magnetization reversal magnetic field) Hsw necessary for recording information is proportional to Ku, and therefore, raising Ku may cause an increase in Hsw.

In order to form magnetization reversal of the recording layer that corresponds to a preferable data series, it is required to apply a recording magnetic field with an intensity that exceeds Hsw that rapidly changes. In recent years, a recording element using a so-called single pole has been used in hard disk drives (HDD), which have made practical by the use of a perpendicular recording system, and a recording magnetic field in a perpendicular direction is applied to the recording layer from an air bearing surface (ABS).

The intensity of the perpendicular recording magnetic field is proportional to a saturation magnetic flux density Bs of a soft magnetic material that forms a single pole. Therefore, a material with a saturation magnetic flux density Bs as high as possible has been developed and put to practical use. However, the practical upper limit of the saturation magnetic flux density Bs is Bs=2.4 tesla (T) from the so-called Slater-Pauling curve, and it may be said that the current situation is approaching the practical limit. Further, the thickness and the width of the current single pole are approximately 100-200 nm. When increasing the recording density, the thickness and width need to be further reduced, and the perpendicular magnetic field generated along with the reduction has a tendency to further decrease.

From such reasons, it can be said that the recording capacity of common data writing elements is about to reach the limit, and high density recording is difficult to overcome in the current condition.

Accordingly, a so-called thermal assisted magnetic recording (TAMR) has been proposed for recording signals by irradiating the recording layer with laser beam or the like and raising its temperature to make a condition where the coercive force of the recording layer is lowered.

However, problems such as those described below still occur even in the thermal assisted recording. Namely, (1) a magnetic head equipped with a magnetic element and an optical element is essential but its structure is extremely complicated and expensive, (2) it is essential to develop a recording layer with a large variation in temperature characteristics for the coercive force, (3) thermal demagnetization in the recording process leads to adjacent track erasure and destabilization of the recording state, and the like.

In contrast, research on spin transfer in electronic conduction has been actively engaged in targeting higher sensitivity of GMR heads and TMR heads as reading elements. A research has begun for applying this to the magnetization reversal of the recording layer of the magnetic disk medium and trying to reduce the perpendicular magnetic field necessary for the magnetization reversal.

This is to apply a high frequency alternating current (AC) magnetic field into the in-plane direction of the recording medium simultaneously with the perpendicular magnetic field for recording. The frequency of the AC magnetic field to be applied into the in-plane direction is an ultra high frequency (several –40 GHz) of a microwave band that corresponds to the ferromagnetic resonant frequency of the magnetic nanoparticles that configure the magnetic recording layer (hereinafter, referred to as simply "recording layer" or "magnetic layer") of the magnetic recording medium.

Furthermore, analysis results are reported that the magnetization reversal magnetic field Hsw of the recording layer can be decreased to inasmuch as 60% by simultaneously applying the AC magnetic field into the in-plane direction. If the present system is practical, there is no need to use the TAMR with a complicated configuration and further it becomes possible to increase Ku of the recording layer so that significant improvement of the recording density can be expected.

The phenomenon that makes the magnetization reversal magnetic field decrease can be obtained by applying the AC magnetic field with a frequency near the ferromagnetic resonance (hereinafter, occasionally referred to as "FMR") frequency of the spin of the magnetic nanoparticles that configure the recording layer so as to excite precession movement of the magnetic nanoparticle spin.

However, since the FRM frequency of the spin sequentially varies according to the angle from a magnetization easy axis of the spin, so only with providing a sine wave of a single frequency, the effect to excite precession movement occurs only when the spin is at a specific angle in the process to achieve the magnetization reversal. An effect to excite precession movement cannot be obtained because the frequencies of the FMR and the AC magnetic field do not match at other angles of a spin.

Ideally, the optimal method is that the assisting microwave frequency sequentially varies to follow the spin angle during the precession movement; however, one cycle of the precession movement is a short cycle of 1 ns or below, and therefore, synchronizing and following in such a cycle is unrealistic.

In order to remove those disadvantages, a method has also been proposed to apply a frequency-modulated wave (hereinafter, occasionally referred to as FM wave) (JP Laid-Open Patent Application No. 2010-3339: Tohoku University). However, because this modulation is performed by a single frequency, the spectrum of the FM wave is in a state where energy is not uniform with gaps therebetween as shown in FIG. 32. It can be said that the assisting effect is extremely small when the FMR frequency of the magnetic nanoparticles that configure the recording layer enters into a gap between modulation frequencies in a missing teeth state (or comb-like state).

Further, there are some issues such as the weakening of the spectrum intensity when separating from the center frequency in the FM wave by a single frequency signal, also the energy of the center frequency may be zero in certain modulation indexes, and the like. Therefore, from these perspectives, it can be said that using the FM wave by a single frequency signal is undesirable.

The present invention is originated from such actual circumstances, and an object is to answer the demand for a proposal of a magnetic recording method that can provide a high assisting effect in which the magnetization reversal is performed efficiently by exciting the precession movement of the spin of the magnetic nanoparticles that configure the recording layer of the magnetic recording medium in both regions with lower and higher frequency than the ferromagnetic resonance (FMR) frequencies.

SUMMARY

In order to solve the drawbacks, a magnetic recording method of the present invention that perform magnetic recording to a recording layer of a magnetic recording medium that is arranged opposed to a thin film magnetic head using a thin film magnetic head, the thin film magnetic head including a main pole, an auxiliary pole, a writing coil for generating a writing magnetic field to the main pole, and either a sub-coil that is arranged between the main pole and the auxiliary pole for generating a magnetic field in a microwave band into an in-plane direction of the magnetic recording medium or a microwave radiator that is provided adjacent to the main pole for radiating microwaves. The method includes: applying a microwave spread spectrum signal (SS signal) to either the sub-coil or the microwave radiator, the microwave SS signal including a ferromagnetic resonant (FMR) frequency of the recording layer as a carrier wave within a band so as to generate an in-plane high-frequency magnetic field so that a magnetization reversal magnetic field Hsw of the recording layer is lowered; and performing the magnetic recording while the magnetization reversal magnetic field Hsw of the recording layer is lowered.

Further, in a preferred embodiment of the magnetic recording method of the present invention, a frequency spectrum of the microwave SS signal is configured to increase signal intensity at 3 dB±1 dB/Oct in a frequency range that is on a lower side than the FMR frequency of the recording layer of the magnetic recording medium; and configured to increase signal intensity at 12 dB±2 dB/Oct in a frequency range that is on a higher side than the FMR frequency.

Further, in a preferred embodiment of the magnetic recording method of the present invention, a frequency spectrum of the microwave SS signal is adjusted by a low-pass filter of which a cutoff frequency is the FMR frequency and of which a frequency property is 3 dB±1 dB/Oct on a lower range side than the FMR frequency in order to increase signal intensity at 3 dB±1 dB/Oct in a frequency range on a lower side than the FMR frequency of the recording layer of the magnetic recording medium and adjusted by a high-pass filter of which a frequency property is 12 dB±2 dB/Oct on a higher range side than the FMR frequency in order to increase signal intensity at 12 dB±2 dB/Oct in a frequency range on a higher side than the FMR frequency.

Further, in a preferred embodiment of the magnetic recording method of the present invention, a frequency spectrum of the microwave SS signal is adjusted by a band-elimination filter, the band-elimination filter having a frequency property that increases signal intensity at 3 dB±1 dB/Oct in a frequency range on a lower side than the FMR frequency and that increases signal intensity at 12 dB±2 dB/Oct in a frequency range on a higher side than the FMR frequency, and a center frequency of the band-elimination filter being the FMR frequency.

Further, in a preferred embodiment of the magnetic recording method of the present invention, the microwave SS signal is formed where a carrier wave that is the FMR frequency of the recording layer of the magnetic recording medium is phase-modulated by a modulation signal due to white noise, and its modulation degree is 0 (0 is not included)-2π (2π is not included) radian.

Further, in a preferred embodiment of the magnetic recording method of the present invention, the microwave SS signal is formed where a carrier wave that is the FMR frequency of the recording layer of the magnetic recording medium is phase-modulated by a modulation signal due to a pseudo noise signal, and its modulation degree is 0 (0 is not included)-2π (2π is not included) radian.

Further, in a preferred embodiment of the magnetic recording method of the present invention, at the same time as a recording magnetic field is applied in a perpendicular direction to a film surface of the recording layer of the magnetic recording medium from the main pole, the microwave SS signal containing the FMR frequency of the recording layer as a carrier wave within the band is applied to either the sub-coil or the microwave radiator, and a high-frequency magnetic field is applied in an in-plane direction of the recording layer of the magnetic recording medium, thereby the magnetic recording is performed by magnetization reversal.

Further, in a preferred embodiment of the magnetic recording method of the present invention, the FMR frequency of the recording layer that is selected as a carrier wave is in the range of 10-20 GHz.

Further, in a preferred embodiment of the magnetic recording method of the present invention, one of terminals that are linked to either the sub-coil or the microwave radiator is connected to a microwave spread spectrum signal source, and the other terminal on the opposite side has a ground potential.

Further, in a preferred embodiment of the magnetic recording method of the present invention, one of terminals that are linked to either the sub-coil or the microwave radiator is connected to a microwave spread spectrum signal source, and the other terminal on the opposite side is connected to a similar signal source of which a phase is 180 degree different from the microwave SS signal source.

Further, in a preferred embodiment of the magnetic recording method of the present invention, a ratio between intensities Hh/Hp is 0.1-0.4, the intensity Hp of a perpendicular magnetic field being excited by the writing coil and applied to the recording layer, and the intensity Hh of an in-plane magnetic field being excited by either the sub-coil or the microwave radiator and applied to the recording layer.

In both regions with lower and higher frequencies than the ferromagnetic resonance (FMR) frequency of the magnetic nanoparticles that configure the recording layer, the magnetization reversal is performed efficiently by exciting the precession movement of the spin of the magnetic nanoparticles that configure the recording layer of the magnetic recording medium so that a high assisting effect can be provided. In other words, according to the present invention, the relationship between the magnetization reversal probability and the frequency of the AC magnetic field are nearly flat and can respond extremely flexibly to changes and variations in the microwave center frequency to be applied as well as to changes and variations in the ferromagnetic resonance (FMR) frequency of the magnetic nanoparticles that configure the recording layer of the magnetic recording medium.

DETAILED DESCRIPTION

Figure 1:
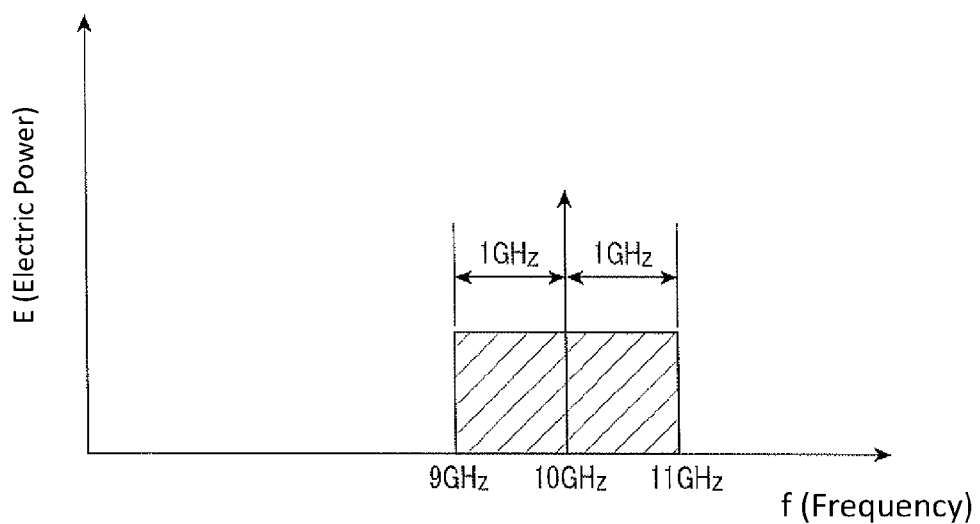
FIG. 1 is a drawing illustrating a schematic state in which a carrier wave that is the ferromagnetic resonant (FMR) frequency of the magnetic particles that configure the recording layer of the magnetic recording medium is phase-modulated by a modulation signal due to white noise to form a microwave spread spectrum signal preferable for the present application.

A detailed description will be given hereinafter regarding the most preferable embodiment for carrying out the present invention.

The magnetic recording method of the present invention is a magnetic recording method that magnetically records to a recording layer of a magnetic recording medium that is arranged opposite to a thin film magnetic head using the thin film magnetic head (microwave assisted head) having a writing pole part (or main pole), an auxiliary pole, a writing coil for generating a writing magnetic field to the writing pole part, and a sub-coil that is arranged between the writing pole part and the auxiliary pole for generating a magnetic field of a microwave band into an in-plane direction of the magnetic recording medium or a microwave radiator that is provided adjacent to the writing pole part for radiating microwaves.

First, a description will be given regarding a main part of the magnetic recording method of the present invention. After that, a description regarding a configuration of the thin film magnetic head (microwave assisted head) used in the present invention will be given.

<Description of Essential Parts of Magnetic Recording Method of Present Invention>

The magnetic recording method of the present invention is to apply a microwave spread spectrum signal (SS signal) containing, within the band, a ferromagnetic resonant (FMR) frequency of magnetic nanoparticles that configure the recording layer of the magnetic recording medium that is the recording target as a carrier wave, to a microwave radiator or sub-coil provided in the thin film magnetic head. Then, magnetic recording is performed while decreasing the magnetization reversal magnetic field Hsw of the magnetic particles that configure the magnetic recording layer (hereinafter, referred to as simply the "recording layer") of the magnetic recording medium by the generated in-plane high-frequency magnetic field.

In other words, the microwave spread spectrum signal (SS signal) containing, within the band, the FMR frequency of the recording layer is applied to the microwave radiator or the sub-coil as the carrier wave while the recording magnetic field is applied in a direction perpendicular to the film surface of the recording layer of the magnetic recording medium from the writing pole part (also referred to as the "main pole") so as to apply a high-frequency magnetic field into an in-plane direction of the recording layer of the magnetic recording medium, and thereby the recording operation by the magnetization reversal is performed.

The microwave spread spectrum signal in the present invention is formed by phase modulation of the carrier wave with the FMR frequency of the recording layer of the magnetic recording medium by modulation signals due to white noise. At that time, the degree of modulation of a phase is 0 (0 is not included)-2π (2π is not included) radian, and more preferably π-2π radian.

In addition, the FMR frequency of the recording layer of the magnetic recording medium is specified by the magnetic properties or the like of the recording layer that is used, and generally the FMR frequency exists within a range of 10-40 GHz, and particularly within a range of 10-20 GHz.

FIG. 1 illustrates a schematic state in which the microwave spread spectrum signal preferable for the present application is formed by conducting phase modulation on the carrier wave with the FMR frequency of the recording layer of the magnetic recording medium by modulation signals due to white noise.

When assuming in FIG. 1 that the FMR frequency of the carrier wave is 10 GHz, then, phase modulation is conducted on the carrier wave with white noise having the frequency bandwidth of 1 GHz (0-1 GHz) as the modulation signal. Then, a frequency spectrum can be obtained in the state where white noise having the frequency bandwidth of 1 GHz (0-1 GHz) is respectively arranged on both sides of the carrier wave of 10 GHz as illustrated in the model illustration of FIG. 1. In other words, as illustrated in FIG. 1, a frequency spectrum can be obtained in which a momentary energy distribution of the frequency axis of the modulated wave is broad (in this example, the width of 2 GHz) and flat.

White noise has the characteristic that a momentary energy distribution of the frequency axis is broad, and the phase modulation has the characteristic that a momentary energy distribution of the frequency axis is flat. In addition, when white noise is modulated into a modulation wave by frequency modulation (FM), the energy distribution decreases as the frequency separates from the carrier wave to become a so-called mountain-shaped spectrum which is unsuitable.

For forming the microwave SS signal, a pseudorandom signal (pseudo noise) may be used instead of the white noise used as the modulation signal. In other words, the microwave SS signal may be formed by performing phase-modulation on the carrier wave with the FMR frequency of the recording layer of the magnetic recording medium by the modulation signal due to the pseudorandom signal (pseudo noise). At that time, the degree of modulation of a phase is 0 (0 is not included)-2π (2π is not included) radian, and more preferably, π-2π radian.

Also in this case, as it is for FIG. 1, the frequency spectrum can be obtained in which a momentary energy distribution of the frequency axis of the modulated wave is broad (in this example, the width of 2 GHz) and flat.

A detailed description regarding white noise is disclosed, for example, in the English Literature "Low-Noise Electric Design," A Willy-Interscience Publications.

Further, a detailed description regarding pseudorandom signals (pseudo noise) is disclosed in the English Literature "DIGITAL COMMUNICATIONS," John Prokis, ISBN 07-066490-0, McGraw Hill.

Figure 2:
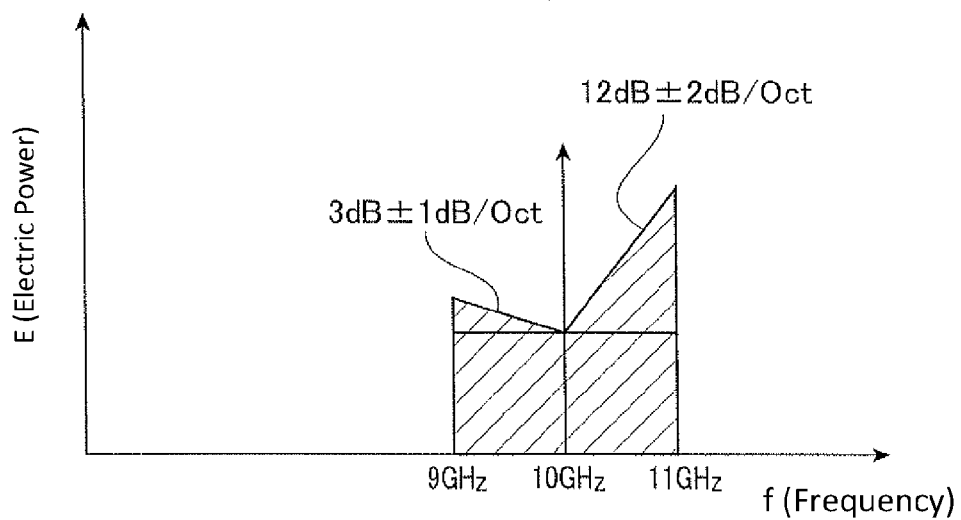
FIG. 2 is a drawing schematically illustrating a frequency spectrum of the microwave spread spectrum signal (SS signal) of a more preferred embodiment.

Further, as a result of dedicated studies by the inventors of the present application, the frequency spectrum of the microwave SS signal of a more preferred form has been proven to be configured so that the signal intensity increases at 3 dB±1 dB/octave (Oct) as approaching a lower-frequency side in the frequency range that is lower than the FMR frequency of the magnetic nanoparticles that configure the recording layer of the magnetic recording medium and so that the signal intensity increases at 12 dB±2 dB/Oct as approaching a higher-frequency side in the frequency range that is higher than the FMR frequency of the magnetic nanoparticles that configure the recording layer of the magnetic recording medium. FIG. 2 illustrates this state. In addition, dB/Oct is an indicator that indicates how much the signal size changes when the frequency doubles. For example, 6 dB/Oct indicates that the signal size increases by 6 dB when the frequency doubles.

The process to reach the conclusion as illustrated in FIG. 2 described above will be described with reference to groups: (1) a group illustrated by FIG. 3-FIG. 5, (2) a group illustrated by FIG. 6-FIG. 8, and (3) a group illustrated by FIG. 9-FIG. 11. Furthermore, the difference between each group described above is in the use of a different material for the recording layer, and (1) in the group of FIG. 3-FIG. 5, the recording layer with an anisotropy field Hk=9 kOe that is the recording target is used for graphing, (2) in the group of FIG. 6-FIG. 8, the recording layer with an anisotropy field Hk=10 kOe that is the recording target is used for graphing, and (3) in the group FIG. 9-FIG. 11, the recording layer with an anisotropy field Hk=11 kOe that is the recording target is used for graphing. Note, a material of the recording layer used for graphing is a CoCrPt—$SiO_2$ granular recording layer. Also, a graph with a similar trend has also been verified for a superlattice film in which (Co/Pd) are alternately laminated into, for example, 20 layers, or other recording layer materials such as FePd, CoPtCrO, CoPt—$TiO_2$ or the like.

Figure 3:
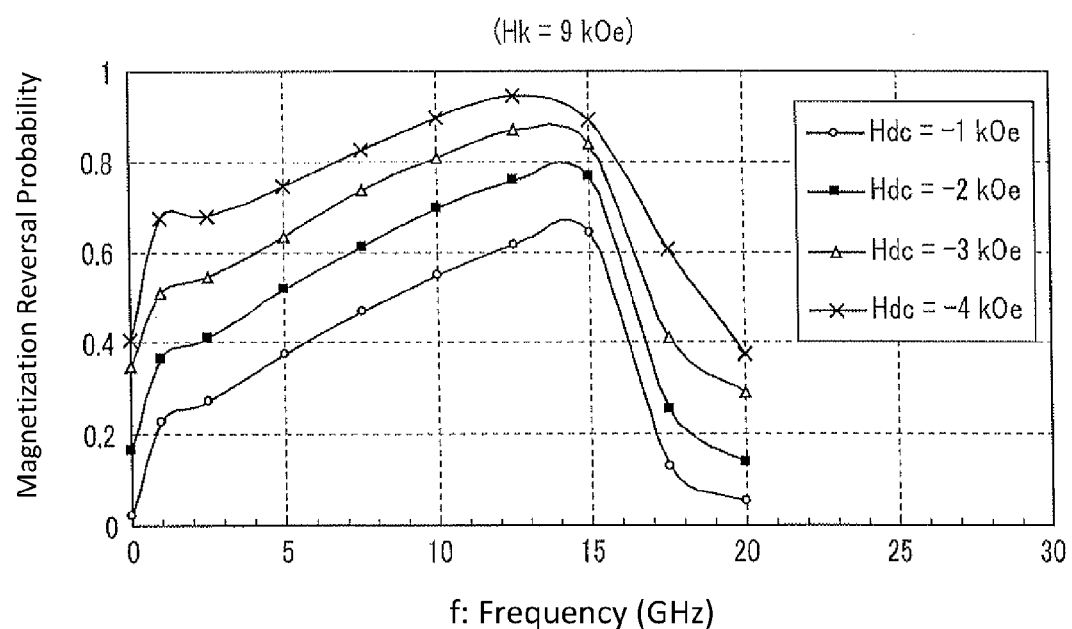
FIG. 3 is a graph illustrating a relation between the magnetization reversal probability that is an indicator of the magnetization reversal and the microwave assisted frequency (horizontal axis) by performing the microwave assistance. An anisotropy field Hk of the recording layer is 9 kOe.
Figure 4:
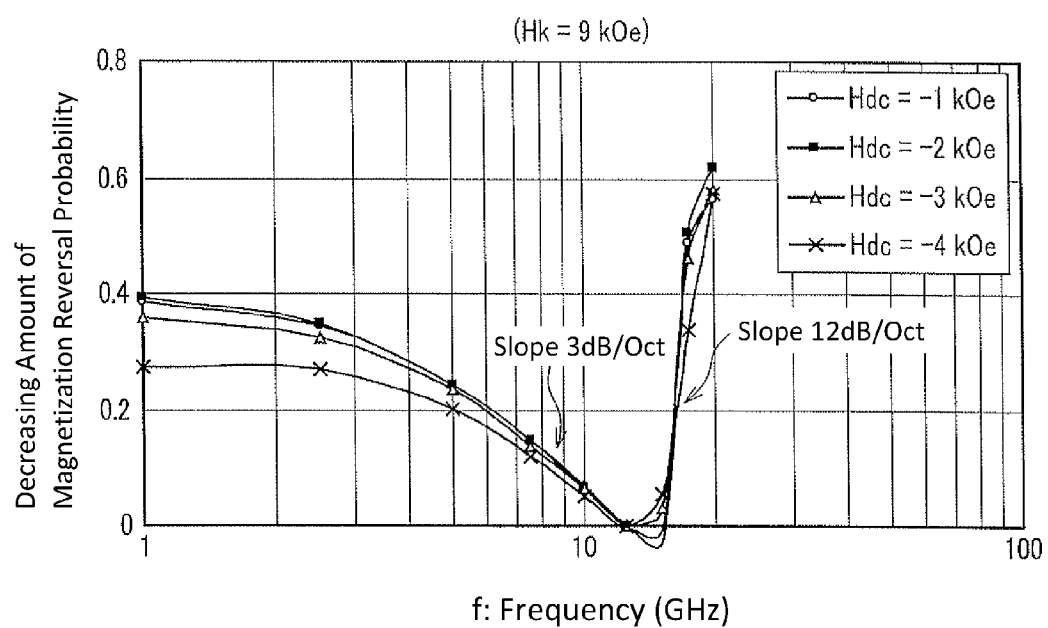
FIG. 4 is a graph illustrating a decreasing amount from a reference for each perpendicular magnetic field in each frequency using the magnetization reversal probability in the frequency with the highest magnetization reversal probability in each graph of the magnetization reversal probability vs. the frequency illustrated in FIG. 3 as the reference. The anisotropy field Hk of the recording layer is 9 kOe.
Figure 5:
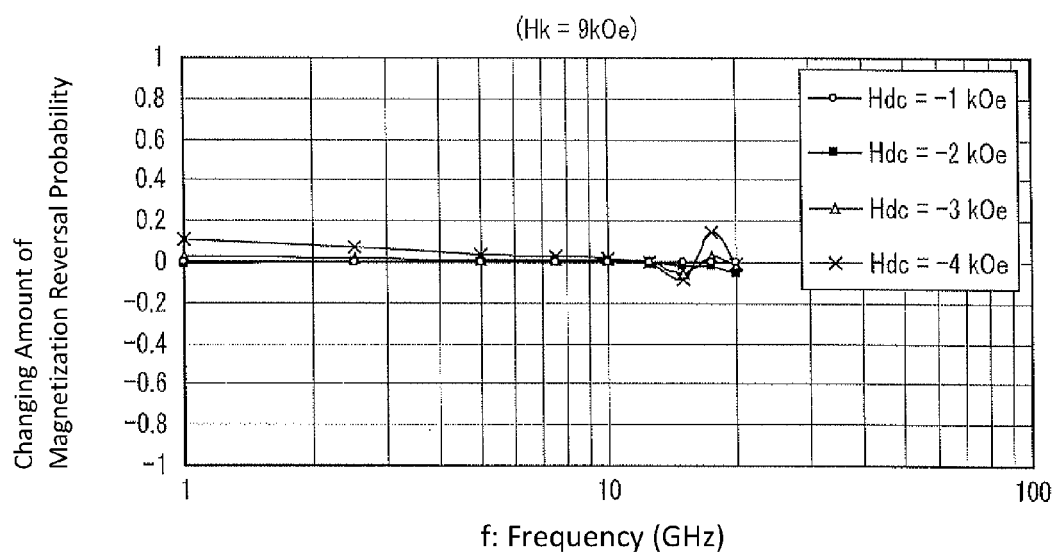
FIG. 5 is a drawing illustrating the frequency property according to a spectrum corrected signal using a specified filter. The anisotropy field Hk of the recording layer is 9 kOe.

(1) Description of Group Illustrated by FIG. 3-FIG. 5

FIG. 3 is a graph illustrating the relation between the magnetization reversal probability (vertical axis) that is an indicator of magnetization reversibility when the microwave assistance is performed and the microwave assisted frequency (horizontal axis). The anisotropy field Hk of the recording layer that is the recording target is 9 kOe.

The magnetization reversal probability is the value in which the number of reversed magnetic particles due to the application of the magnetic field is divided by the total number of magnetic particles when the perpendicular magnetic field (in this case, the direction of the magnetic field is negative) that is in the reverse direction to the magnetization direction of the magnetic particles is applied simultaneously with the microwave magnetic field of the in-plane direction in the state where all of the magnetic particles of the medium are magnetized in the same direction. In other words, the magnetization reversal probability of zero indicates that none of the magnetic particles have reversed, 0.5 indicates that half of the magnetic particles have reversed, and one indicates that all of the magnetic particles have reversed. Further, each parameter in the graphs is the perpendicular magnetic field (Hdc) that corresponds to the magnetic field that a single pole head generates. As illustrated in the graph of FIG. 3, it is determined that the microwave frequency for exciting the precession movement has a proper frequency characteristic in which the energy distribution has a low-frequency regions gradually broadening centering on the FMR frequency that is the highest point of each graph and a high-frequency regions in which the sensitivity suddenly deteriorates.

In other words, as illustrated in the graph of FIG. 3, the precession movement can be excited with the smallest microwave energy near the FMR frequency (approximately 13 GHz in FIG. 3). However, because the magnetization reversal probability lowers when the frequency moves away from the FMR frequency (approximately 13 GHz) to the lower-side (low-frequency) and the higher-side (high-frequency) frequencies respectively, supplemental microwave energy becomes needed for that. Accordingly, it is considered that the precession movement is uniformly excited even in the regions with the higher frequency and the lower frequency than the FMR frequency when the energy is increased as moving away from the FMR frequency (approximately 13 GHz) so that a higher assisting effect can be obtained to trigger the magnetization reversal.

In the graph of the magnetization reversal probability vs. the frequency illustrated in FIG. 3, the frequency at the highest magnetization reversal probability is approximately 13 GHz when Hdc=−4 kOe; and there is a slight shift with other perpendicular magnetic field intensities so that it does not always match. In FIG. 4, the frequency f=approximately 13 GHz when Hdc=−4 kOe is the reference, and it is configured so that the lowest points of the V curves in FIG. 4 for Hdc=−1 kOe, Hdc=−2 kOe, and Hdc=−3 kOe are made to substantially match when approximately 13 GHz is the reference which is the frequency with the highest magnetization reversal probability at Hdc=−4 kOe.

The graph in FIG. 4 illustrates the decreasing amount (Δ magnetization reversal probability) from the reference in each frequency with a positive numerical value as the value and is a graph that depicts the intensity of each perpendicular magnetic field. In other words, the vertical axis in FIG. 4 indicates the difficulty of the magnetization reversal in comparison with the optimum condition, and the greater the numerical value, the harder it is for the magnetization reversal to occur. The horizontal axis in FIG. 4 is modified to logarithmic expression.

As illustrated in FIG. 4, when extrapolating the average value of the slope of the graph, the slope is approximately 3 dB/Oct on the low-frequency region side, and approximately 12 dB/Oct on the high-frequency region side. In other words, it can be determined that the respective characteristics change in the FMR frequency as the reference point because the slope is approximately 3 dB/Oct on the low-frequency side as well as approximately 12 dB/Oct on the high-frequency side. This is the frequency characteristic itself of magnetization reversal probability, and this is based on the idea that supplying a large microwave energy can suppress the lowering of the magnetization reversal probability even when the magnetization reversal probability lowers. Therefore, the magnetization reversal can be performed efficiently by supplying a large energy signal at approximately 3 dB/Oct for the low-frequency side and at approximately 12 dB/Oct for the high-frequency side from the FMR resonant point as illustrated in FIG. 2. Accordingly, it can be understood that a signal source can be made that has a frequency characteristic such that the signal intensity increases at 3 dB±1 dB/Oct in a frequency band lower than the FMR frequency and the signal intensity increases at 12 dB±2 dB/Oct in a frequency band higher than the FMR frequency. In addition, the reason why the fluctuation range of ±1 dB/Oct is set for the frequency band lower than the FMR frequency and the fluctuation range of ±2 dB/Oct is set for the high-frequency band is to follow the actual situation by verifying the actual fluctuation range by data or the like.

In addition, the characteristics of the graph illustrated in FIG. 4 have been verified by a simulation where even when the material of the magnetic recording layer is variously changed as will be described below, only the FMR frequency that is the center to match the film shifts, but the gradients of 3 dB±1 dB/Oct on the lower frequency side and 12 dB±2 dB/Oct on the high-frequency side demonstrate a tendency to not change.

This type of signal source, in other words, the frequency spectrum that is configured such that the signal intensity increases at 3 dB±1 dB/Oct on the frequency region side that is lower than the FMR frequency of the magnetic particles that configure the recording layer of the magnetic recording medium while the signal intensity increases at 12 dB±2 dB/Oct in the frequency range side that is higher than the FMR frequency of the recording layer of the magnetic recording medium, is formed, for example, in combination with a low-pass filter and a high-pass filter. In other words, the frequency spectrum of the microwave SS signal may be adjusted by the low-pass filter so as to have the cutoff frequency being the FMR frequency and to have the frequency characteristic of 3 dB±1 dB/Oct on the low region side of the FMR frequency in order to increase the signal intensity at 3 dB±1 dB/Oct in the frequency region on the side that is lower than the FMR frequency of the magnetic nanoparticles that configure the recording layer of the magnetic recording medium, while on the other hand, may be adjusted by the high-pass filter so as to have the frequency characteristic of 12 dB±2 dB/Oct on the high region side of the frequency in order to increase the signal intensity at 12 dB±2 dB/Oct in the frequency region on the side that is higher than the FMR frequency.

Further, the signal source described above may also be formed by using, for example, a band-elimination filter. In other words, the frequency spectrum of the microwave SS signal may be adjusted by the band-elimination filter so as to have the frequency characteristic that the signal intensity increases at 3 dB±1 dB/Oct in the frequency range side that is lower than the FMR frequency while the signal intensity increases at 12 dB±2 dB/Oct in the frequency range side that is higher than the FMR frequency and to have the center frequency being the FRM frequency.

Figure 12:
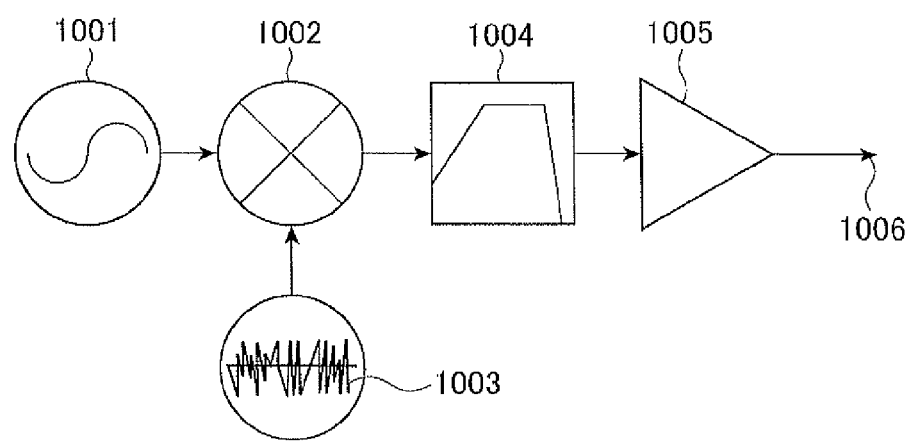
FIG. 12 is a drawing of a specific example of an electronic circuit.

FIG. 12 illustrates a specific example of an electronic circuit. In FIG. 12, numerical reference 1001 is an oscillator of the carrier wave, 1002 is a phase modulator, 1003 is a spread signal (white noise or pseudorandom noise), 1004 is a filter, 1005 is an amplifier, and 1006 is a microwave signal to be discharged.

FIG. 5 illustrates the frequency characteristics of the magnetization reversal probability due to the microwave magnetic field that is actually spectrum-corrected by using these filters. The vertical axis of FIG. 5 is the changing amount from the magnetization reversal probability at the frequency in which the magnetization probability is the maximum, and particularly, Hdc=−4 kOe and the frequency f=approximately 13 GHz are the reference here that is zero. From the graph illustrated in FIG. 5, it can be determined that the frequency characteristics of the magnetization reversal probability are substantially flat. The relation between the magnetization reversal probability and the frequency becomes nearly flat by applying the microwave magnetic field to the medium where the energy is changed at 3 dB±1 dB/Oct for the low-frequency side and at 12 dB±2 dB/Oct for the high-frequency side while the FMR frequency is the reference. Even when the applied assisting center frequency and the FMR frequency of the magnetic nanoparticles that configure the recording layer of the magnetic recording medium, although being approximately 13 GHz here, are varied, an extremely excellent effect is demonstrated that can maintain stable magnetization reversal probability as illustrated in FIG. 5.

Figure 6:
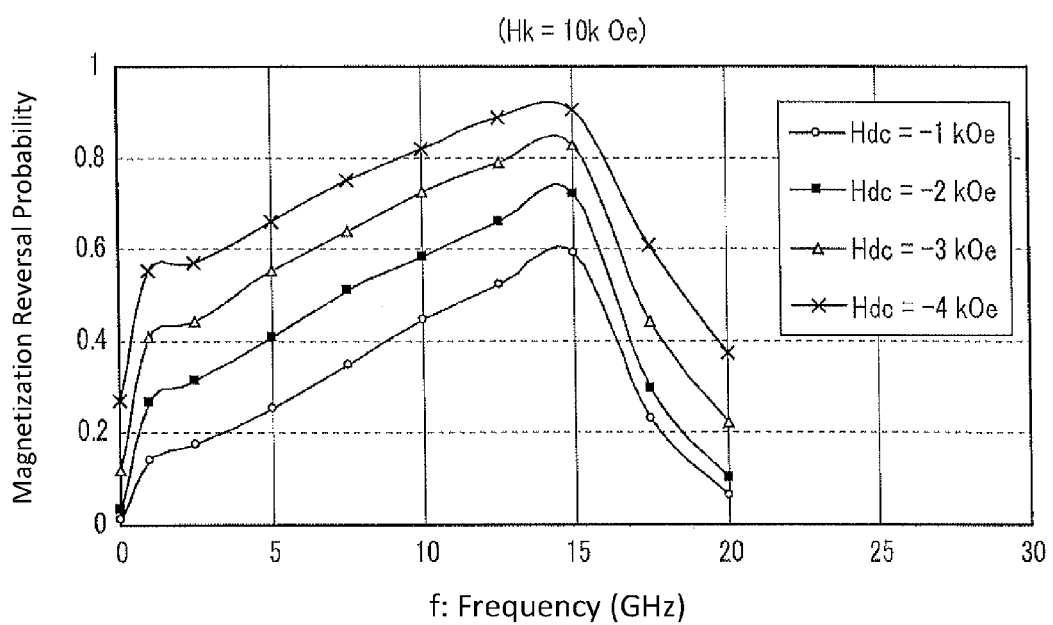
FIG. 6 is a graph illustrating a relation between the magnetization reversal probability that is an indicator of magnetization reversal and the microwave assisted frequency (horizontal axis) by performing the microwave assistance. The anisotropy field Hk of the recording layer is 10 kOe.
Figure 7:
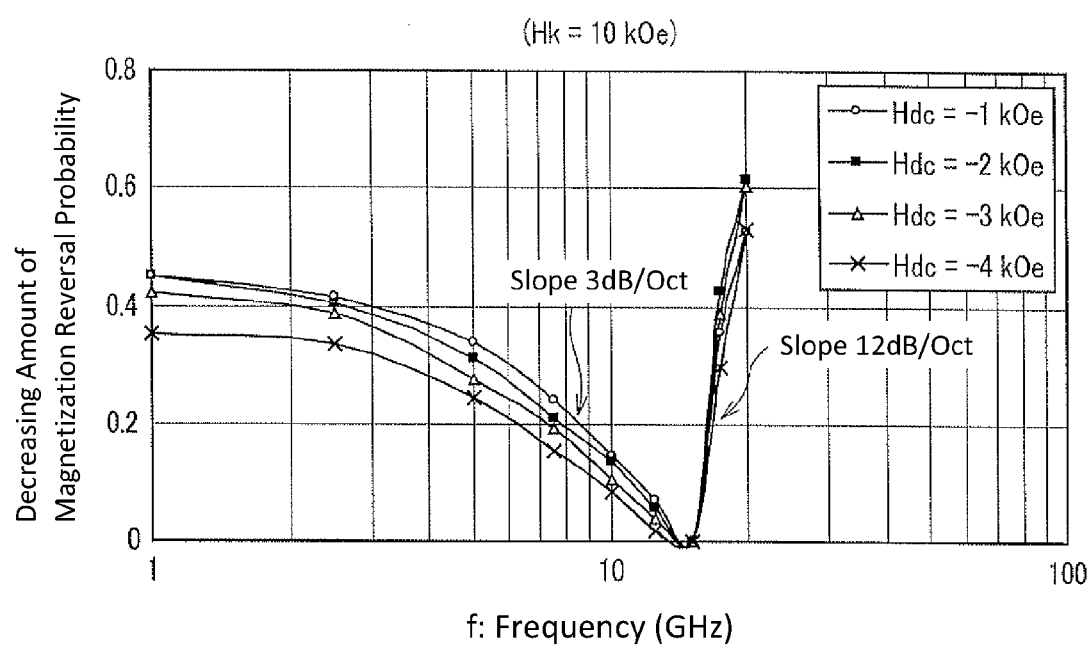
FIG. 7 is a graph illustrating a decreasing amount from a reference for each perpendicular magnetic field in each frequency using the magnetization reversal probability in the frequency with the highest magnetization reversal probability in each graph of the magnetization reversal probability vs. the frequency shown in FIG. 6 as the reference. The anisotropy field Hk of the recording layer is 10 kOe.
Figure 8:
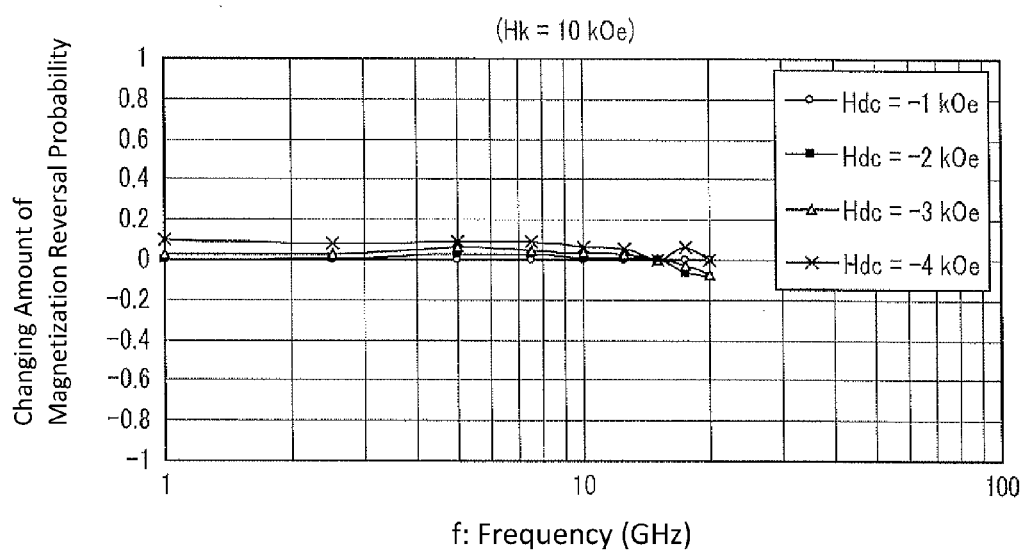
FIG. 8 is a drawing illustrating the frequency property according to a spectrum corrected signal using a specified filter. The anisotropy field Hk of the recording layer is 10 kOe.

(2) Description of Group Illustrated by FIG. 6-FIG. 8

FIG. 6, corresponding to FIG. 3 described above, is a graph that illustrates the relation between the magnetization reversal probability (vertical axis) that is the indicator of the magnetization reversibility and the microwave assisted frequency (horizontal axis) by performing microwave assistance. In FIG. 6, the anisotropy field Hk of the recording layer that is the recording target is 10 kOe.

The magnetization reversal probability is the value in which the number of reversed magnetic particles due to the application of the magnetic field is divided by the total number of magnetic particles when the perpendicular magnetic field that is in the reverse direction to the magnetization direction of the magnetic particles is applied simultaneously with the microwave magnetic field of the in-plane direction in the state where all of the magnetic particles are magnetized in the same direction. In other words, the magnetization reversal probability of zero indicates that none of the magnetization particles have reversed, 0.5 indicates that half of the magnetization particles have reversed, and one indicates that all of the magnetization particles have reversed. Further, each parameter in the graphs is the perpendicular magnetic field that corresponds to the magnetic field that a single magnetic pole head generates. As illustrated in the graph of FIG. 6, it is determined that the microwave frequency for exciting the precession movement has a proper frequency characteristic in which the energy distribution has the low-region frequency broadening centering on the FMR frequency that is the highest point of each graph in which the sensitivity suddenly deteriorates.

In other words, as illustrated in the graph of FIG. 6, the precession movement can be excited with the smallest microwave energy near the FMR frequency (approximately 15 GHz in FIG. 6). However, because the magnetization reversal probability lowers when the frequency moves away from the FMR frequency (approximately 15 GHz) to the lower-side (low-frequency) and the higher-side (high-frequency) frequencies respectively, supplemental microwave energy becomes needed for that. Accordingly, it is considered that the precession movement is uniformly excited even in the regions with the higher frequency and the lower frequency (approximately 15 GHz) than the FMR frequency when the energy is increased as moving away from the FMR frequency (approximately 15 GHz) so that a higher assisting effect can be obtained to trigger the magnetization reversal.

In the graph of the magnetization reversal probability vs. the frequency illustrated in FIG. 6, the frequency at the highest magnetization reversal probability is at approximately 15 GHz when Hdc=−4 kOe; and there is a slight shift with other perpendicular magnetic field intensities so that it does not always match. In FIG. 7, the frequency f=approximately 15 GHz when Hdc=−4 kOe is the reference, and it is configured so that the lowest points of the V curves in FIG. 7 for Hdc=−1 kOe, Hdc=−2 kOe, and Hdc=−3 kOe are made to substantially match when approximately 15 GHz is the reference which is the frequency with the highest magnetization probability at Hdc=−4 kOe.

The graph in FIG. 7 illustrates the decreasing amount (Δ magnetization reversal probability) from the reference in each frequency with a positive numerical value as the value and is a graph that depicts the intensity of each perpendicular magnetic field. In other words, the vertical axis in FIG. 7 indicates the difficulty of the magnetization reversal in comparison with the optimum condition, and the greater the numerical value, the harder it is for magnetization reversal to occur. Further, the horizontal axis of FIG. 7 is modified to a logarithmic expression.

As illustrated in FIG. 7, it is determined that the respective characteristics change in the FMR frequency as the reference point because the slope is approximately 3 dB/Oct on the low-frequency side as well as approximately 12 dB/Oct on the high-frequency side. Accordingly, it can be understood that a signal source can be made that has a frequency characteristic such that the signal intensity increases at 3 dB±1 dB/Oct in a frequency band lower than the FMR frequency and the signal intensity increases at 12 dB±2 dB/Oct in a frequency band higher than the FMR frequency. In addition, the reason why the fluctuation range of ±1 dB/Oct is set for the frequency band lower than the FMR frequency and the fluctuation range of ±2 dB/Oct is set for the high-frequency band is to follow the actual situation by verifying the actual fluctuation range by data or the like.

FIG. 8 illustrates the frequency characteristics of the magnetization reversal probability due to the microwave magnetic field that is actually spectrum-corrected by using each filter illustrated in FIG. 12. The vertical axis of FIG. 8 is the changing amount from the magnetization reversal probability at the frequency where the magnetization reversal probability is the maximum, and particularly Hdc=−4 kOe and the frequency f=approximately 15 GHz are the reference of zero here. From the graph illustrated in FIG. 8, it can be determined that the frequency characteristics of the magnetization reversal probability are substantially flat. The relation between the magnetization reversal probability and the frequency becomes nearly flat by applying the microwave magnetic field to the medium where the energy is changed at 3 dB±1 dB/Oct on the low-frequency side and at 12 dB±2 dB/Oct on the high-frequency side while the FMR frequency is the reference. Even when the applied assisting center frequency and the FMR frequency of the magnetic nanoparticles that configure the recording layer of the magnetic recording medium are varied, an extremely excellent effect is demonstrated that can maintain the stable magnetization reversal probability as illustrated in FIG. 8.

Figure 9:
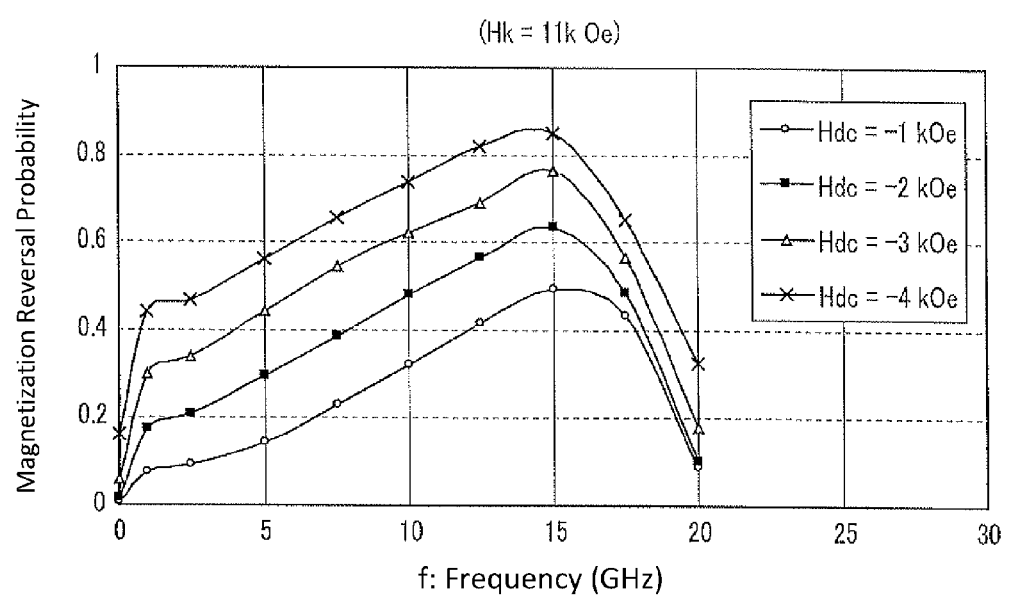
FIG. 9 is a graph illustrating a relation between the magnetization reversal probability that is an indicator of magnetization reversal and the microwave assisted frequency (horizontal axis) by performing the microwave assistance. The anisotropy field Hk of the recording layer is 11 kOe.
Figure 10:
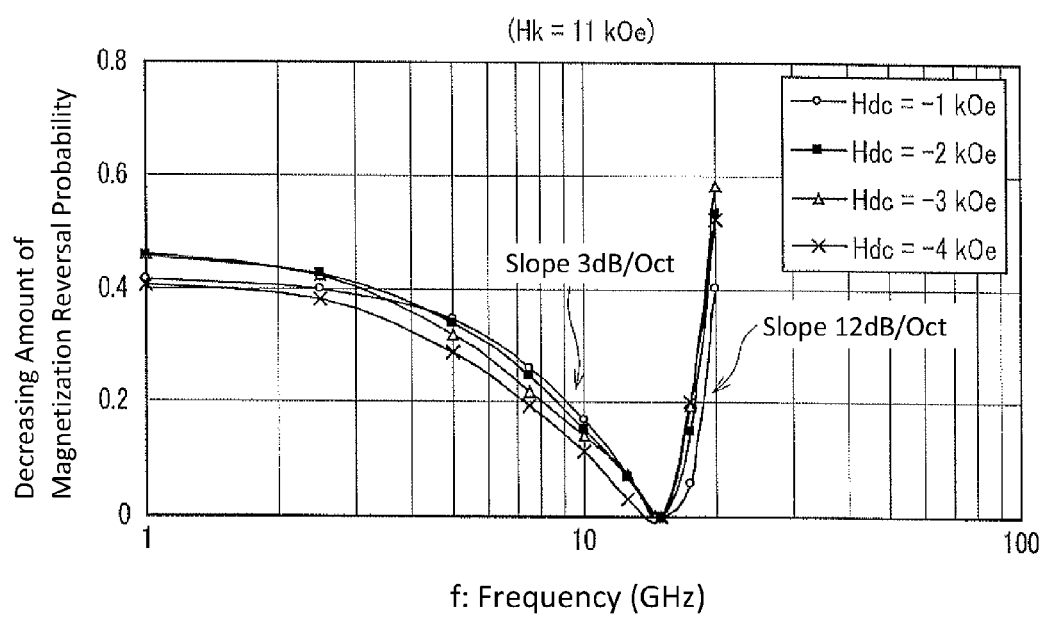
FIG. 10 is a graph illustrating a decreasing amount from a reference for each perpendicular magnetic field in each frequency using the magnetization reversal probability in the frequency with the highest magnetization reversal probability in each graph of the magnetization reversal probability vs. the frequency shown in FIG. 9 as the reference. The anisotropy field Hk of the recording layer is 11 kOe.
Figure 11:
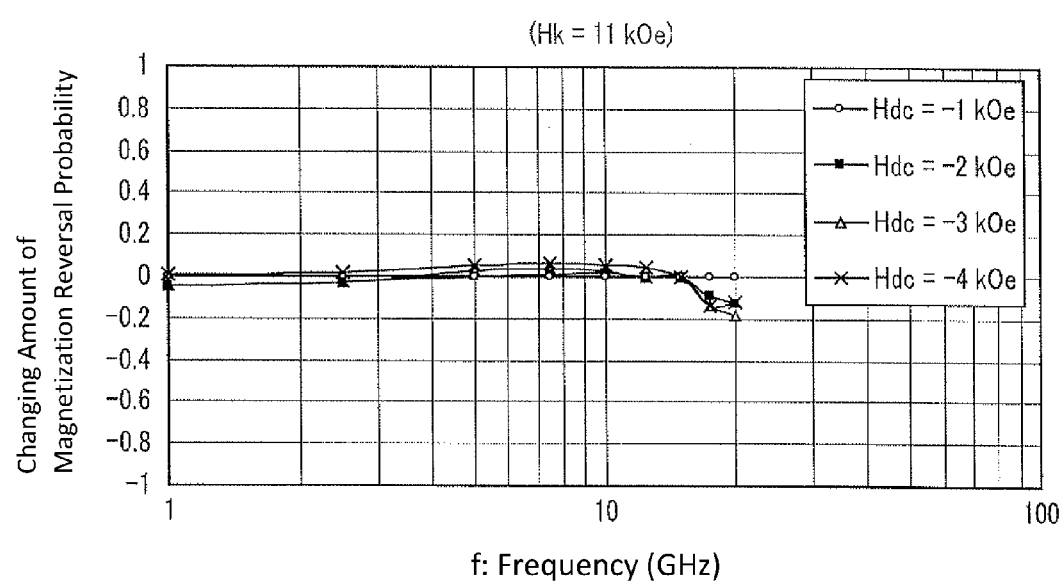
FIG. 11 is a drawing illustrating the frequency property according to a spectrum corrected signal using a specified filter. The anisotropy field Hk of the recording layer is 11 kOe.

(3) Description of Group Illustrated by FIG. 9-FIG. 11

FIG. 9, corresponding to FIG. 3 and FIG. 6 described above, is a graph that illustrates the relation between the magnetization reversal probability (vertical axis) that is the indicator of the magnetization reversibility and the microwave assisted frequency (horizontal axis) by performing microwave assistance. In FIG. 9, the anisotropy field Hk of the recording layer that is the recording target is 11 kOe.

The magnetization reversal probability is the value in which the number of reversed magnetic particles due to the application of the magnetic field is divided by the total number of magnetic particles when the perpendicular magnetic field that is in the reverse direction to the magnetization direction of the magnetic particles is applied simultaneously with the microwave magnetic field of the in-plane direction in the state where all of the magnetic particles are magnetized in the same direction. In other words, the magnetization reversal probability of zero indicates that none of the magnetization particles have reversed, 0.5 indicates that half of the magnetization particles have reversed, and one indicates that all of the magnetic particles have reversed. Further, each parameter in the graphs is the perpendicular magnetic field that corresponds to the magnetic field that a single magnetic pole generates. As illustrated in the graph of FIG. 9, it is determined that the microwave frequency for exciting the precession movement has a proper frequency characteristic in which the energy distribution has the low frequency regions broadening centering on the FMR frequency that is the highest point of each graph and the high frequency regions in which the sensitivity suddenly deteriorates.

In other words, as illustrated in the graph of FIG. 9, the precession movement can be excited with the smallest microwave energy near the FMR frequency (approximately 15 GHz in FIG. 9). However, because the magnetization reversal probability lowers when the frequency moves away from the FMR frequency (approximately 15 GHz) to the lower-side (low-frequency) and the higher-side (high-frequency) frequencies respectively, supplemental microwave energy becomes needed for that. Accordingly, it is considered that the precession movement is uniformly excited even in the regions with the higher frequency and the lower frequency than the FMR frequency when the energy is increased as moving away from the FMR frequency (approximately 15 GHz) so that a higher assisting effect can be obtained to trigger the magnetization reversal.

The frequency at the highest magnetization reversal probability in each graph of the magnetization reversal probability vs. the frequency illustrated in FIG. 9 is at approximately 15 GHz when Hdc=−4 kOe; and there is a slight shift with other perpendicular magnetic field intensities so that it does not always match. In FIG. 10, the frequency f=approximately 15 GHz when Hdc=−4 kOe is the reference, and it is configured such that the lowest points of the V curves in FIG. 10 for Hdc=−1 kOe, Hdc=−2 kOe, and Hdc=−3 kOe are made to substantially match when approximately 15 GHz is the reference which is the frequency with the highest magnetization probability at Hdc=−4 kOe.

The graph in FIG. 10 illustrates the decreasing amount (Δ magnetization reversal probability) from the reference in each frequency with a positive numerical value as the value and is a graph that depicts the intensity of each perpendicular magnetic field. In other words, the vertical axis in FIG. 10 indicates the difficulty of the magnetization reversal in comparison with the optimum condition, and the greater the numerical value, the harder it is for magnetization reversal to occur. Further, the horizontal axis of FIG. 10 is modified to a logarithmic expression.

As illustrated in FIG. 10, it can be determined that the respective characteristics change in the FMR frequency as the reference point because the slope is approximately 3 dB/Oct on the low-frequency side as well as approximately 12 dB/Oct on the high-frequency side. Accordingly, it can be understood that a signal source can be made that has a frequency characteristic such that the signal intensity increases at 3 dB±1 dB/Oct in a frequency band lower than the FMR frequency and the signal intensity increases at 12 dB±2 dB/Oct in a frequency band higher than the FMR frequency. In addition, the reason why the fluctuation range of ±1 dB/Oct is set for the frequency band lower than the FMR frequency and the fluctuation range of ±2 dB/Oct is set for the high-frequency band is to follow the actual situation by verifying the actual fluctuation range by data or the like.

FIG. 11 illustrates the frequency characteristics of the magnetization reversal probability due to the microwave magnetic field that is actually spectrum-corrected by using each filter illustrated in FIG. 12. The vertical axis of FIG. 11 is the changing amount from the magnetization reversal probability at the frequency in which the magnetization reversal probability is the maximum, and particularly Hdc=−4 kOe and the frequency f=approximately 15 GHz are the reference of zero here. From the graph illustrated in FIG. 11, it is examined that the frequency characteristics of the magnetization reversal probability are substantially flat. The relation between the magnetization reversal probability and the frequency becomes nearly flat by applying the microwave magnetic field to the medium where the energy is changed at 3 db±1 dB/Oct on the low-frequency side and at 12 db±2 dB/Oct on the high-frequency side while the FMR frequency is the reference. Even when the applied assisting center frequency and the FMR frequency of the magnetic nanoparticles that configure the recording layer of the magnetic recording medium are varied, an extremely excellent effect is demonstrated that can maintain the stable magnetization reversal probability as illustrated in FIG. 11.

From the results illustrated in FIG. 3 to FIG. 11 in the three groups having different recording film characteristics described above, it is determined that even when the material of the magnetic recording layer is variously changed, only the FMR frequency that is the center that matches the film shifts, but the gradients of 3 dB±1 dB/Oct on the low-frequency side and 12 db±2 dB on the high-frequency side have a tendency not to change.

(Description of Example of Preferred Configuration of Magnetic Recording Medium)

Figure 13:
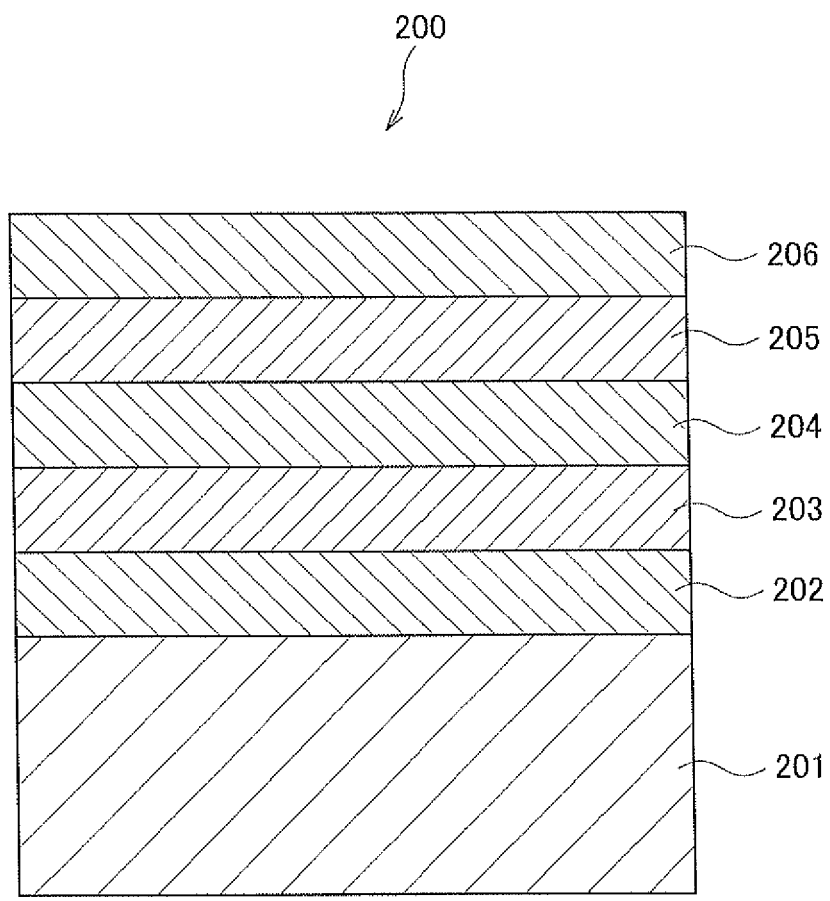
FIG. 13 is a lamination cross-sectional view of a magnetic recording medium.

A description regarding an example of a preferred configuration of the magnetic recording medium will be given simply based on FIG. 13. Magnetic recording medium 200 illustrated as a lamination cross section in FIG. 13 includes a lamination structure in which, for example, a soft magnetic under layer 202, an intermediate layer 203, a recording layer 204, a protective layer 205, and a lubricant layer 206 are sequentially laminated on a substrate 201.

The substrate 201 is preferably, for example, a glass substrate, a lamination substrate in which a Ni—P layer is laminated on an Al alloy layer, or the like.

The soft magnetic under layer 202 is preferably, for example, an FeCoTaZr layer, a FeCoB layer, a CoTaZr layer, or the like. The thickness is 50-200 nm.

For the intermediate layer 203, for example, Ru, PdPt, MgO, or the like is used. The thickness is 10-25 nm.

For the recording layer 204, for example, a CoCrPt—$SiO_2$ granular recording layer, a superlattice film in which (Co/Pd) are alternately laminated to be, for example, 20 layers as described above, or a material such as FePd, CoPtCrO, CoPt—$TiO_2$, or the like is used. The thickness is 10-25 nm.

For the protective layer 205, for example, carbon, particularly diamond-like carbon (DLC) is preferably used. The thickness is 2-5 nm.

For the lubricant layer 206, for example, perfluoropolyether, or the like is preferably used. The thickness is 1-3 nm.

(Description of Structure of Thin Film Magnetic Head)

In carrying out the magnetic recording method of the present invention described above, a common head structure with no microwave assisting mechanism will be described with reference to FIG. 14-FIG. 20 prior to giving a description regarding the thin film magnetic head (microwave assisted head) to be used. This is because it will be easy to understand the structure of the microwave assisted head to be used for carrying out the magnetic recording method of the present invention by describing this type of common head structure in advance.

<Description of Common Head Structure with No Microwave Assisting Mechanism>

A description will be given regarding the common head structure with no microwave assisting mechanism.

In the description of the present invention below, a measurement of the X-axis direction illustrated in drawings is referred to as the "width", a measurement of the Y-axis direction is referred to as the "length", and a measurement of the Z-axis direction is referred to as the "thickness or height." Further, a near side to an air bearing surface (surface of the thin film magnetic head opposed to the recording medium) in the Y-axis direction is referred to as "frontward (front)," and the opposite side (deep side) thereof is referred to as "rearward (rear).". Also, the direction to stack a lamination film is referred to as "upper (above and on)" or "upper side", and the opposite direction thereof is referred to as "lower (below)" or "lower side".

Figure 14:
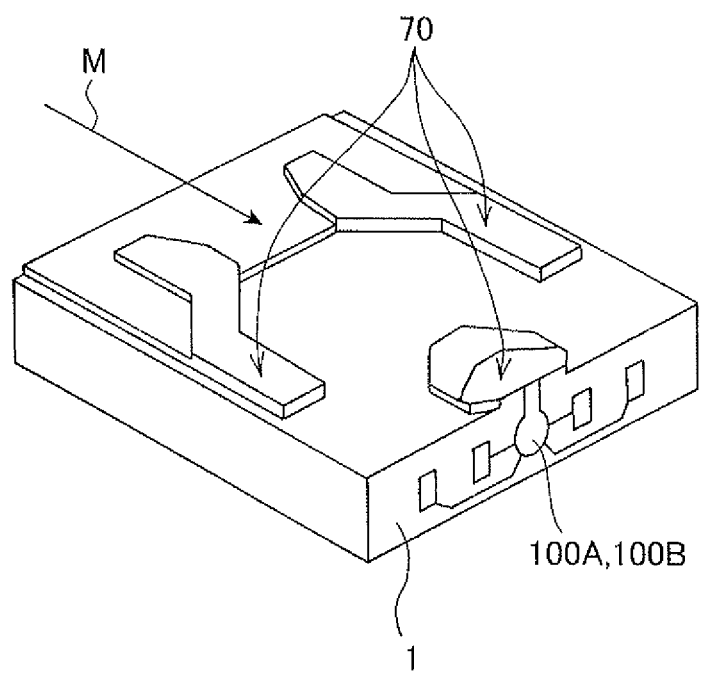
FIG. 14 is a perspective view schematically illustrating an overall structure of a magnetic head.
Figure 15:
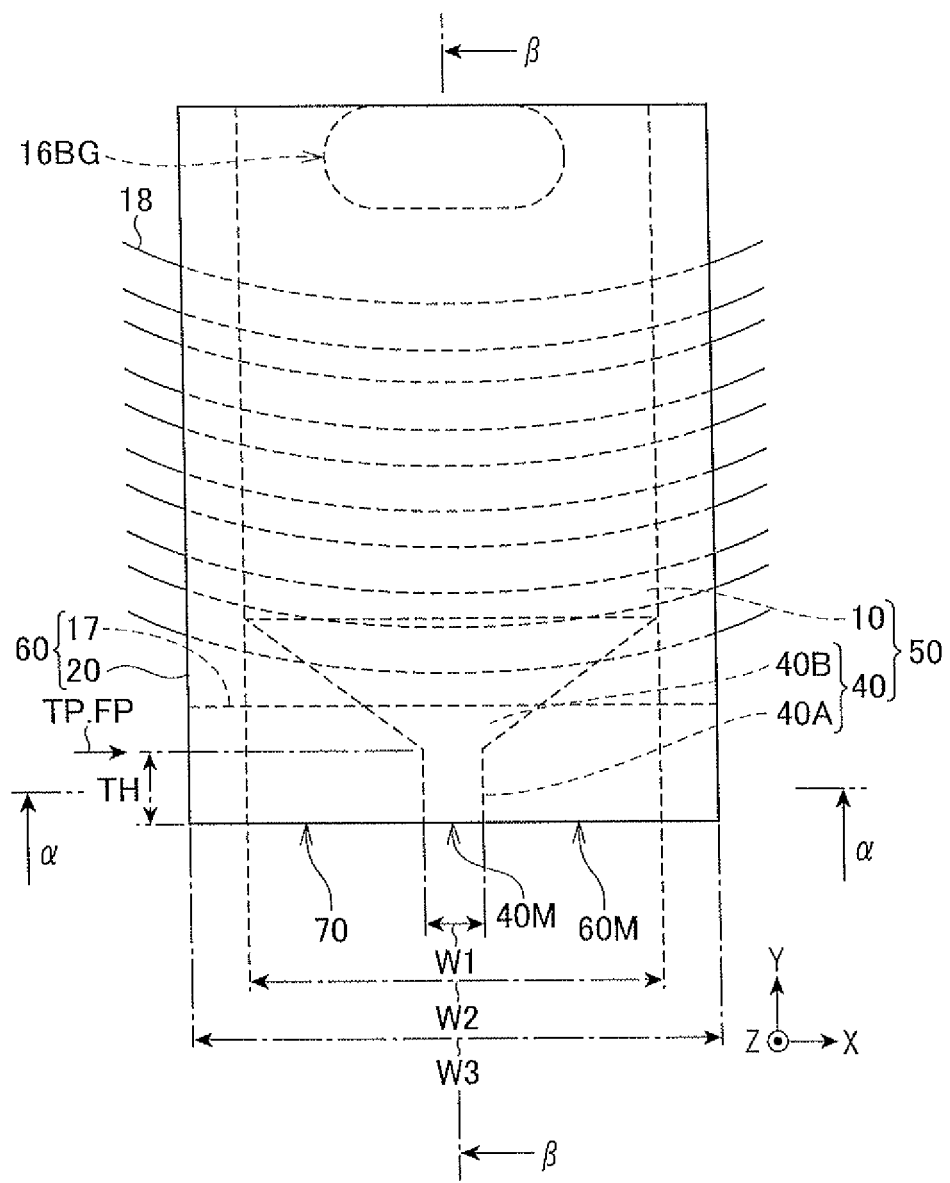
FIG. 15 is a plan view (lamination direction) of a recording head part of the magnetic head.
Figure 16:
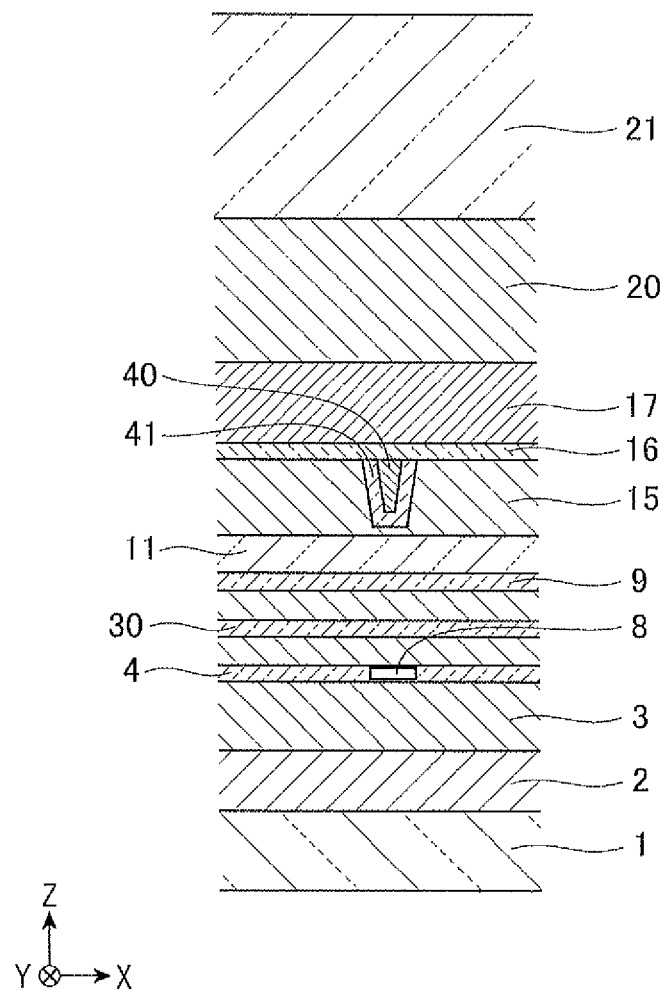
FIG. 16 is a cross-sectional view along the arrows α-α of FIG. 15.

FIG. 14 is a perspective view schematically illustrating an overall structure of the magnetic head. FIG. 15 is a plan view of the recording head part of the magnetic head. FIG. 16 is a cross-sectional view of the arrows α-α of FIG. 15, and FIG. 17 is a cross-sectional view of the arrows β-β of FIG. 15.

As illustrated in FIG. 14, the magnetic head has a slider base 1 of a substantially rectangular prism structure. The slider base 1 has an air bearing surface 70 that is directly associated with the flying characteristic, and a recording head part 100B and a reproducing head part 100A are provided on a side end surface placed on an air outflow end side (trailing edge side) with respective to the air flow direction M (similar to the substantial line travel direction of the disk shaped magnetic recording medium).

Figure 17:
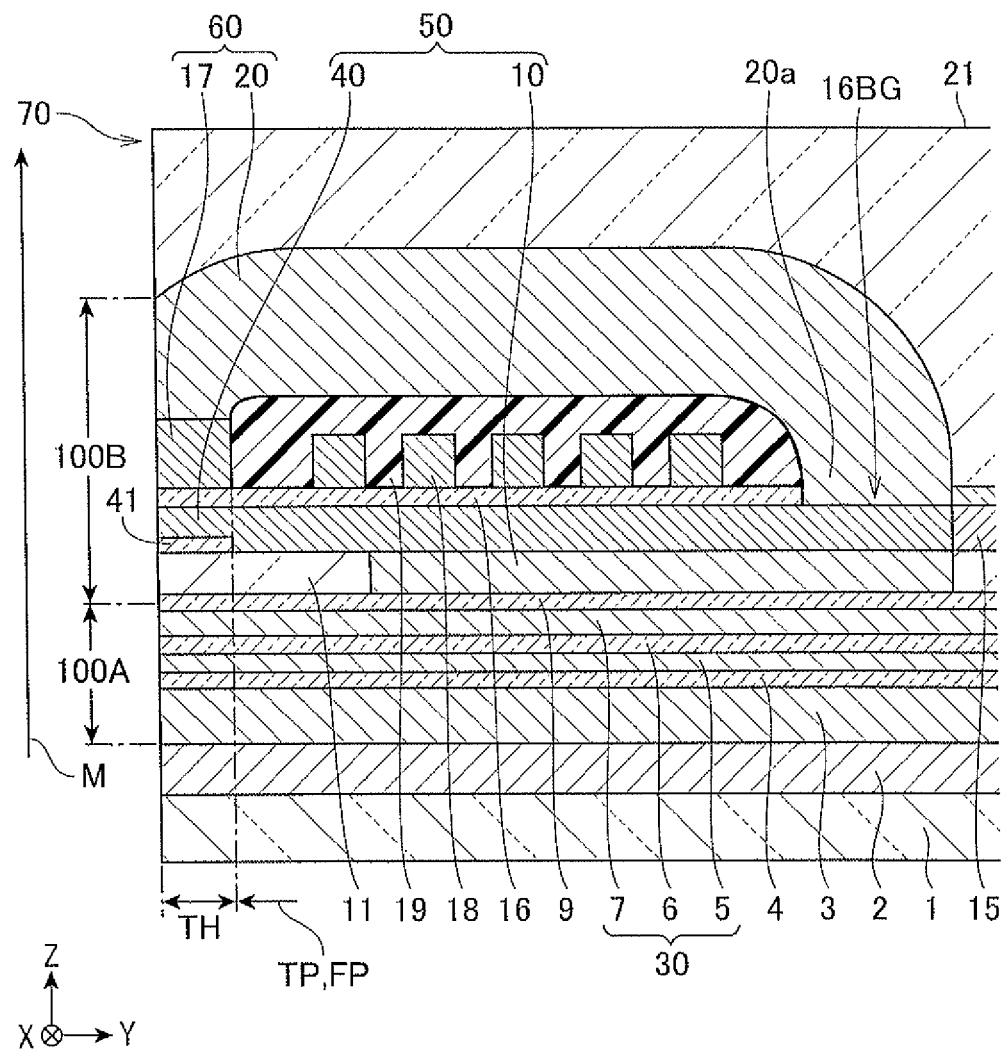
FIG. 17 is a cross-sectional view along the arrows β-β of FIG. 15.

FIG. 15-FIG. 17 illustrate details of the recording head part 100B and the reproducing head part 100A.

The magnetic head illustrated in FIG. 14-FIG. 17 is configured as a composite type head that can execute both recording and reproducing. The magnetic head is configured in the state where an insulating film 2, the reproducing head part 100A utilizing magneto-resistive (MR) effect, a separation film 9, the recording head part 100B to execute a recording process of the perpendicular recording system, and a nonmagnetic film 21 to be an overcoat film are sequentially laminated on the slider base 1.

(Description of Reproducing Head Part 100A)

The reproducing head part 100A is configured by laminating, for example, a lower read shield film 3, a shield gap film 4, and an upper read shield film 30 in this order. A reproducing head element (MR element 8) is embedded in the shield gap film 4 so as to be exposed to the air bearing surface 70 (see FIG. 16).

Both the lower read shield film 3 and the upper read shield 30 function to magnetically separate the MR element 8 from the periphery, and are configured by extending rearward from the air bearing surface 70. The lower read shield film 3 is configured of, for example, a magnetic material such as a nickel-iron alloy (NiFe) or the like. The upper read shield film 30 is configured, for example, by laminating two upper read shield film portions 5 and 7 that sandwich a nonmagnetic film 6. Both the upper read shield film portions 5 and 7 are configured by, for example, a magnetic material such as a nickel-iron alloy or the like. The nonmagnetic film 6 is configured by, for example, a nonmagnetic material such as ruthenium (Ru), alumina, or the like. In addition, the upper read shield film 30 is not limited to the three-layer structure described above, and may be a structure composed of one layer configured by, for example, a magnetic material such as a nickel-iron alloy (NiFe), or the like.

The shield gap film 4 functions to electrically separate the MR element 8 from the periphery and is configured of, for example, a nonmagnetic insulating material such as alumina or the like. The MR element 8 is configured from, for example, an element of a giant magneto-resistive effect (GMR), tunneling magneto-resistive effect (TMR), or the like.

(Description of Recording Head Part 100B)

The recording head part 100B includes a nonmagnetic film 11, a pole film 50, a magnetic gap film 16 provided with an opening part for magnetic linking (backgap 16BG), a coil film 18 embedded inside an insulating film 19, a magnetic film 60, a first write shield film 15, and a second write shield film 17.

The nonmagnetic film 11 functions to electrically and magnetically separate an auxiliary pole film 10 from the periphery and is configured of, for example, a nonmagnetic material such as alumina or the like.

The pole film 50 extends rearward from the air bearing surface 70 and includes the auxiliary pole film 10 and a main pole film 40. The auxiliary pole film 10 and the main pole film 40 may be arranged in a vertically (Z direction) inverted manner according to a design specification. Further, the magnetic layer for linking that is formed in the opening part (backgap 16BG) for magnetic linking may be also referred to as a linking yoke 20a.

The auxiliary pole film 10 extends to the backgap 16 GB from a position that is receded from the air bearing surface 70. The auxiliary pole film 10 is arranged, for example, on the leading side in relative to the main pole film 40, and has a rectangular planar shape (width dimension W2) as illustrated in FIG. 15. The auxiliary pole film 10 may be arranged on the trailing side of the main pole film 40 as described above.

The main pole film 40 extends to the backgap 16BG from the air bearing surface 70. As illustrated in FIG. 15, this main pole film 40 includes, for example, a writing pole part 40A with a narrow width extending rearward from the air bearing surface 70 and a body part 40B with a wide width linking to the rearward of the writing pole part 40A.

The writing pole part 40A is a substantive discharging part (so-called pole film) of a magnetic flux and has a constant width dimension W1 for prescribing the recording track width. The body part 40B is a part that supplies the magnetic flux to the writing pole part 40A and has a width dimension W2 that is wider than the width dimension W1. The width of the body part 40B gradually narrows as it approaches the writing pole part 40A toward the front. The position where the width dimension of the main pole film 40 begins to widen from the width dimension W1 to the width dimension W2 is a so-called flare point FP.

The main pole film 40 is an inverted trapezoidal shape where an end surface 40M on a side near the air bearing surface 70 has a long side positioned on the trailing side and a short side positioned on the leading side as the upper bottom and lower bottom respectively. An upper end edge of the trapezoidal shape is the substantive recording location.

The magnetic gap film 16 is a gap to magnetically separate the pole film 50 and the magnetic film 60 and is configured of, for example, a nonmagnetic insulating material such as alumina, or a nonmagnetic conductive material such as ruthenium or the like.

The recording coil film 18 is to generate the magnetic flux for magnetic recording to the medium and is configured of, for example, a highly conductive material such as copper (Cu) or the like. The recording coil film 18 has a spiral structure that is wound around the backgap 16BG (linkage yoke 20a) as the center as illustrated in FIG. 15.

An insulating film 19 is to electrically separate the recording coil film 18 from the periphery and is configured by a nonmagnetic insulating material such as, for example, a spin on glass (SOG), or a photoresist that exhibits liquidity at heating, or the like. The most front end position of the insulating film 19 is the throat height zero position TP, and the distance between the throat height zero position TP and the air bearing surface 70 is the so-called throat height TH. FIG. 15 illustrates a case in which the throat height zero position TP matches with the flare point FP.

The magnetic film 60 makes the gradient of the perpendicular magnetic field steep by taking in spread components thereof within the magnetic flux that is discharged from the pole film 50, and at the same time, makes the magnetic flux circulate between the recording head 100B and the recording medium by taking in the magnetic flux returning from the recording medium. The magnetic film 60 is, while extending rearward from the air bearing surface 70 on the trailing side of the pole film 50, separated from the pole film 50 by the magnetic gap film 16 at the front, and at the same time, is linked to the pole film 50 through the backgap 16BG at the rear. An end surface 60M of the magnetic film 60 on the side near the air bearing surface 70 is, for example, a rectangular shape having the width dimension W3 that is larger than the width dimension W1 as illustrated in FIG. 15. The magnetic film 60 includes, for example, the second write shield film 17 and a return yoke film 20 that are mutually separate bodies.

The first and second write shield films 15 and 17 mainly perform an increasing function for the perpendicular magnetic field gradient and is configured by a high-saturation magnetic flux density magnetic material such as, for example, a nickel-iron alloy, iron-based alloy, or the like. The first and second write shield films 15 and 17 configure the so-called wrap-around structure. These films may be referred to as a trailing shield 200 in the present application including the magnetic film 20.

In the wrap-around structure illustrated in FIG. 16, the first write shield film 15 is adjacent to both side surfaces on the air bearing surface side of the writing pole part 40A that configures the main pole film 40 through the magnetic gap film 41. Accordingly, a side shield film is formed by the write shield film 15 on both side parts of the writing pole part 40A.

Further, the second write shield film 17 is adjacent to an upper surface on the air bearing surface side of the writing pole part 40A with the magnetic gap film 16 therebetween. The second write shield film 17 is also referred to as a pedestal yoke, and the magnetic gap film 16 that is sandwiched between the second write shield film 17 and the upper surface of the writing pole part 40A is a write gap.

The first and second write shield films 15 and 17 take in the spread component of the magnetic flux discharged from the pole film 50 by the arrangement described above to increase the magnetic field gradient of the perpendicular magnetic field and narrow the recording width.

The second write shield film 17 extends rearward from the air bearing surface 70 while being adjacent to the magnetic gap film 16 and then adjacent to the insulating film 19 at the rear end. Therefore, the write shield film 17 performs the role of prescribing the most front end position (throat height zero position TP) of the insulating film 19.

The return yoke film 20 performs the circulation function of the magnetic flux and is configured by, for example, a magnetic material similar to the write shield film 17. The return yoke film 20 extends to the backgap 16BG via an upper surface of the insulating film 19 from the air bearing surface 70 on the trailing side of the write shield film 17 as illustrated in FIG. 17, and is linked to the write shield film 17 in the front and is also linked to the pole film 50 through the backgap 16BG in the rear.

The nonmagnetic film 21 protects the magnetic head and is configured by, for example, a nonmagnetic insulating material such as alumina or the like.

Figure 18:
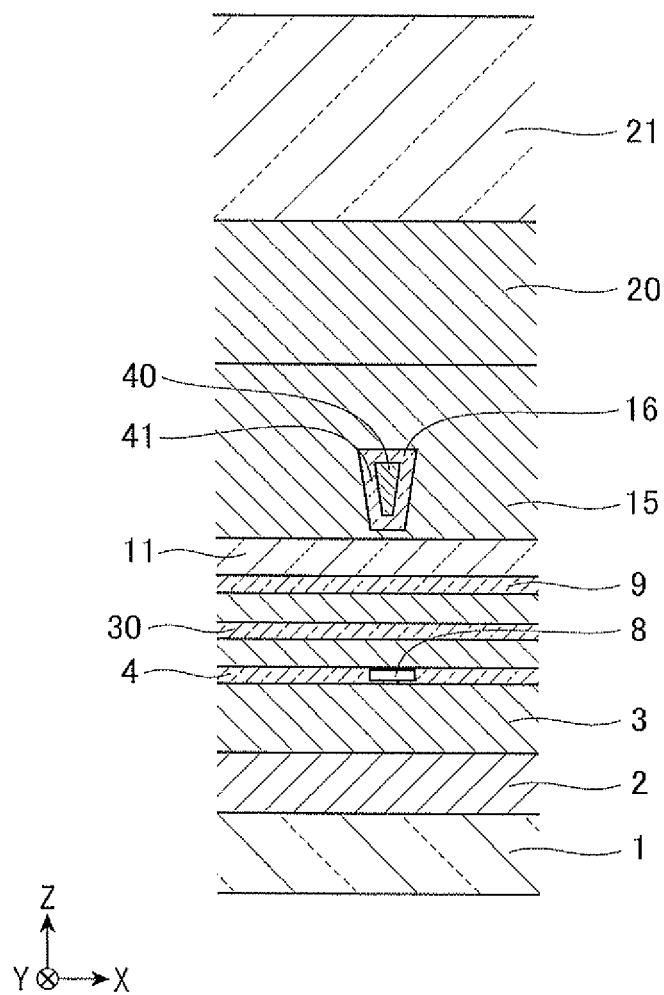
FIG. 18 is another configuration example of a wrap-around structure and is a corresponding view of FIG. 16.

FIG. 18 illustrates another form example of the wrap-around structure. In this example, the entire circumference of the writing pole part 40A is covered by a sequence of the magnetic gap film 41 and the upper magnetic gap film 16, and the write shield film 15 that corresponds to the first and second write shields (15 and 17) is arranged in the periphery thereof. In other words, this is the structure where the writing pole part 40A is embedded inside the write shield film 15, and the shield film positioned on both sides of the writing pole part 40A functions as the side shield film, and the shield film positioned on an upper side functions as the second write shield film in FIG. 14-FIG. 17.

The wrap-around structure is not limited to the form described above, and various forms may be selected.

Figure 19:
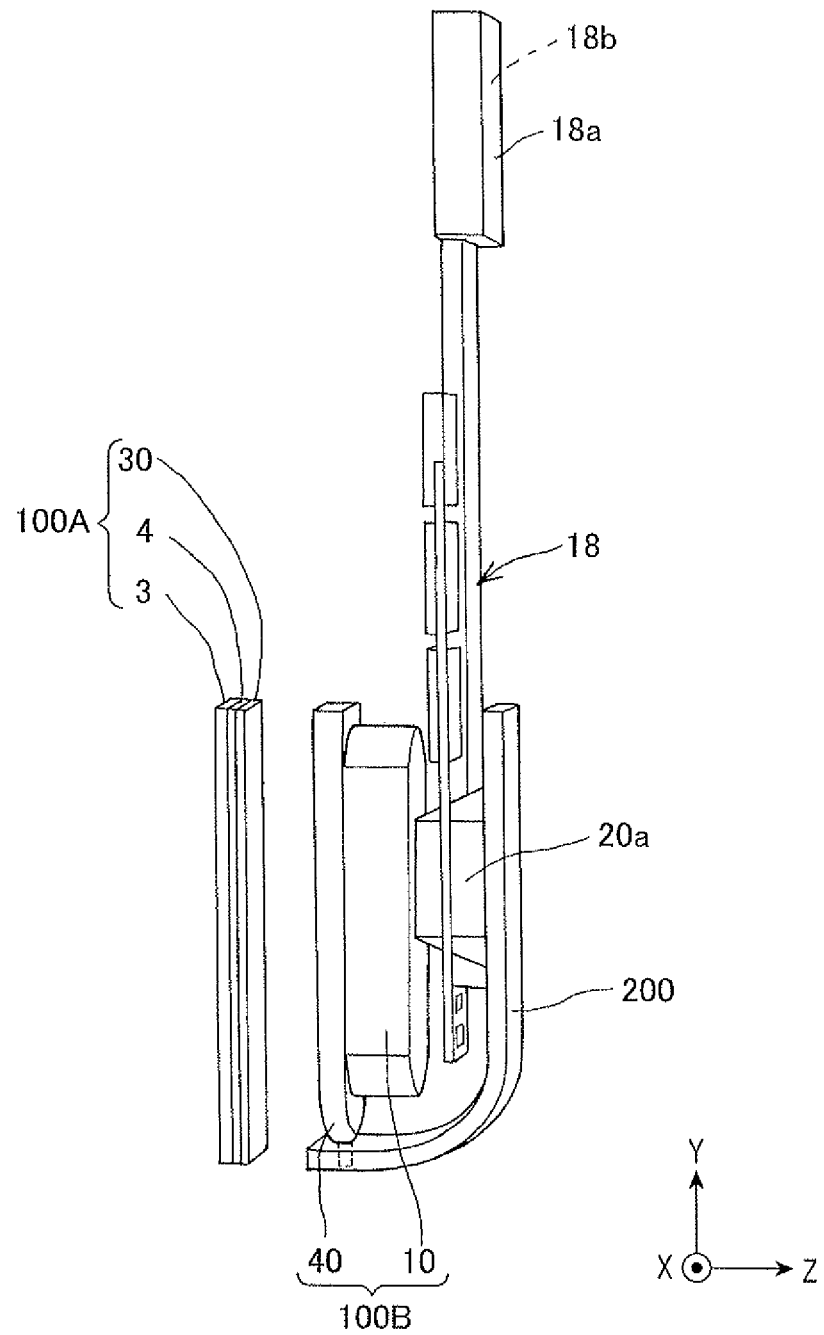
FIG. 19 is a schematic configuration view (perspective view approximating a substantial Y-Z plan view) illustrating a main part of the magnetic head with the wrap-around structure.
Figure 20:
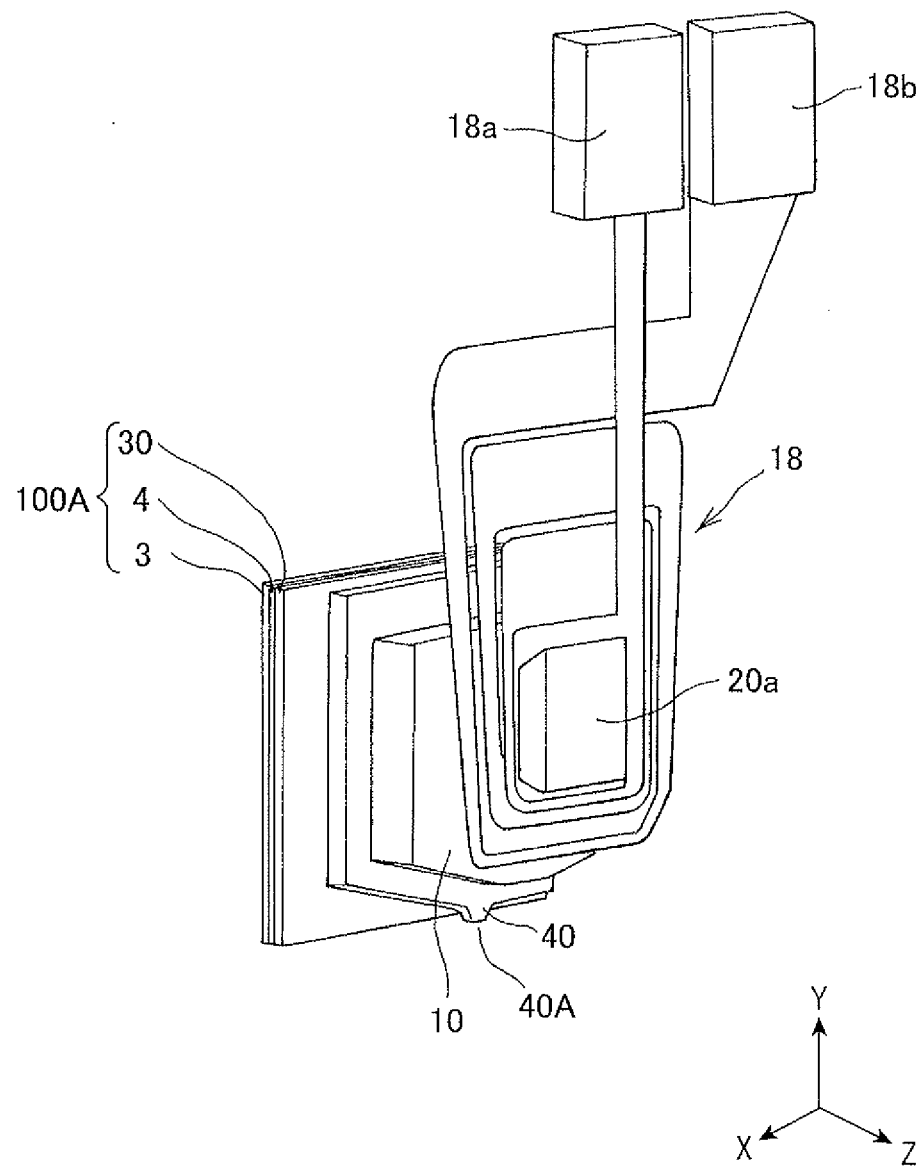
FIG. 20 is a perspective view to make the internal part of the head more stereoscopically visible by removing a trailing shield 200 from FIG. 19.

FIG. 19 illustrates a schematic configuration view (a perspective view approximating a substantial Y-Z plan view) illustrating main parts of the magnetic head with the wrap-around structure. FIG. 20 illustrates a perspective view to make the internal part of the head more stereoscopically visible by removing the trailing shield 200 from FIG. 19. These drawings illustrate only the structure of the main parts. The numerical references that are the same as those previously indicated are members having substantially similar functions. In these drawings, an example where the auxiliary pole film 10 is arranged on the trailing side of the main pole film 40 is described. The numerical references 18a and 18b are bonding pads for the recording coil. Further, in FIG. 19, although the bonding pads for the recording coil and the coil overlap and thereby those configurations are difficult to comprehend, the content thereof can be clarified by viewing FIG. 20. In addition, a cutout part is formed on the ABS of the trailing shield 200 in a corresponding location such that the writing pole part 40A that is an tip end of the main pole film 40 illustrated in FIG. 20 is exposed to the ABS. This is to enable the writing magnetic field to discharge toward the magnetic recording medium from the writing pole part 40A.

Next, a description will be given regarding a configuration example of the thin film magnetic head (microwave assisted head) used for carrying out the magnetic recording method of the present invention. There are two types of configurations: one is the configuration of the thin film magnetic head that is provided with the sub-coil and another is the configuration of the thin film magnetic head that is provided with the microwave radiator.

<Configuration of Thin Film Magnetic Head Provided with Sub-Coil for Generating a Magnetic Field of Microwave Band>

Figure 21:
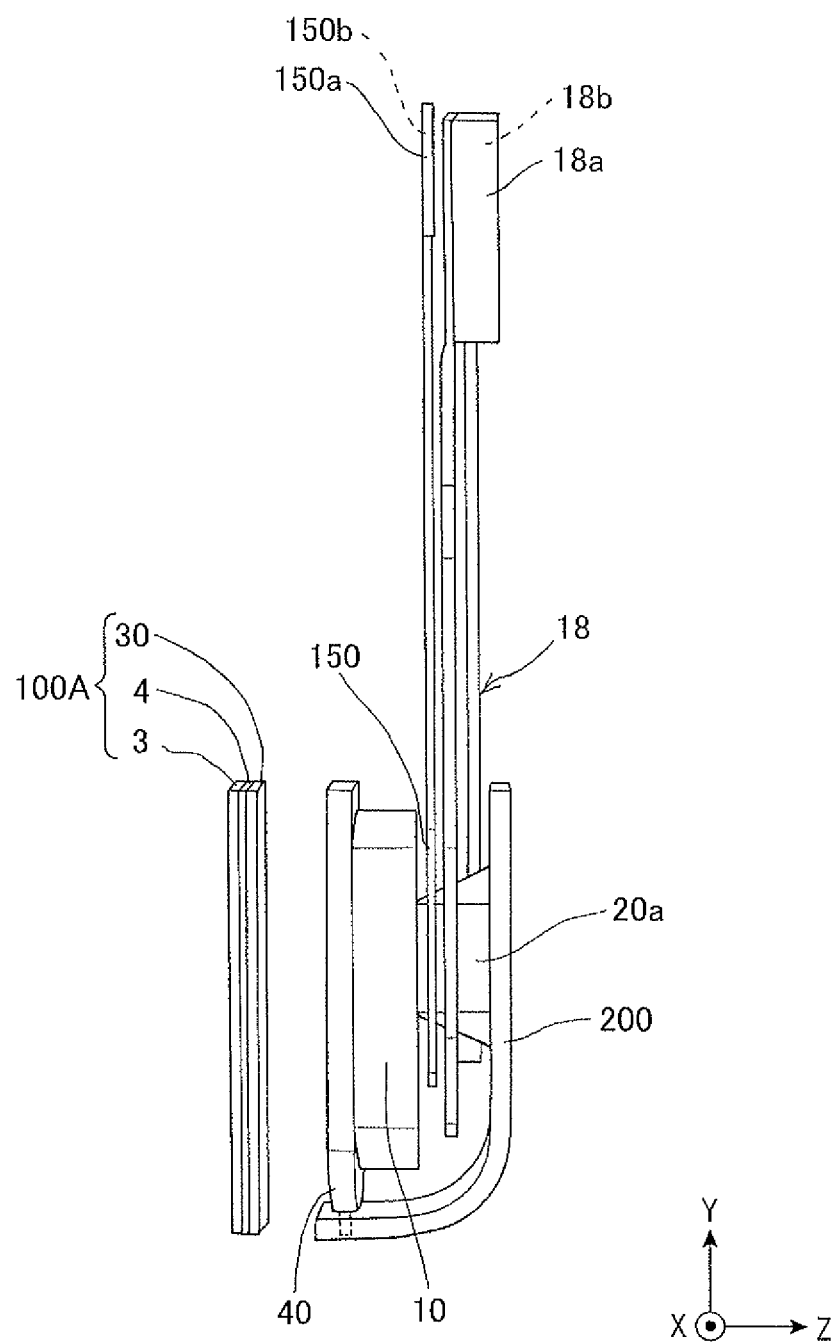
FIG. 21 is a schematic view approximating a substantial Y-Z plan view of a thin film magnetic head that is provided with the sub-coil 150 between the main pole film 40 of the magnetic head and the trailing shield 200 that corresponds to the auxiliary pole and is the type for generating an in-plane AC magnetic field by driving the AC of the microwave band, that is modulated preferably for performing the recording method of the present invention, to the sub-coil.
Figure 22:
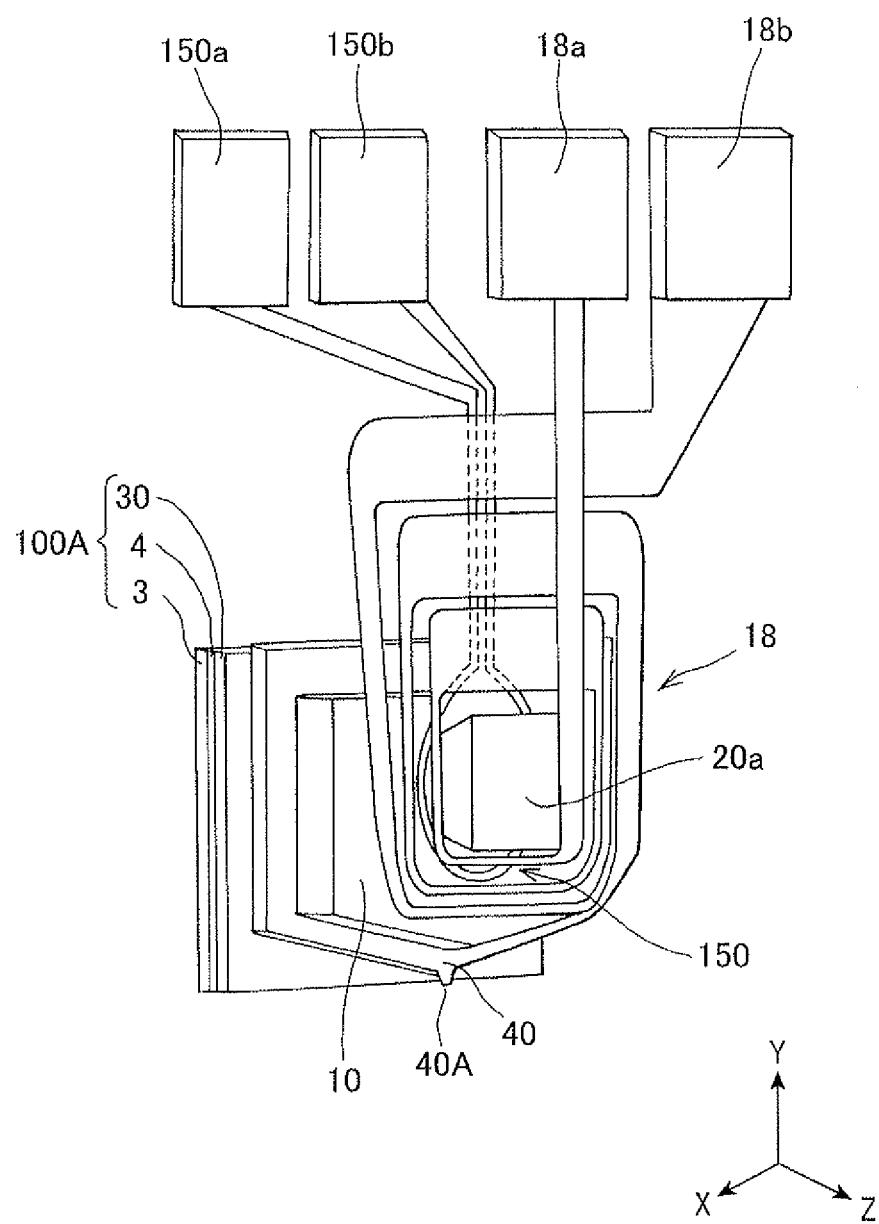
FIG. 22 is a perspective view to make an internal part of the head, especially the existence of the sub-coil, stereoscopically visibly by removing the trailing shield from the state illustrated in FIG. 21.

The magnetic head illustrated in FIG. 21 and FIG. 22 is the magnetic head provided with a sub-coil 150 as the microwave assisting technique.

FIG. 21 is a schematic view of a virtual Y-Z plan view that is the thin film magnetic head provided with the sub-coil 150 between the main pole film 40 of the magnetic head and the trailing shield 200 that corresponds to the auxiliary pole and is the type that generates an in-plane AC magnetic field in the sub-coil 150 by driving the AC in the microwave band that is modulated preferably for carrying out the recording method of the present invention.

FIG. 22 is a perspective view to make an internal part of the head, especially the existence of the sub-coil 150, more stereoscopically visible by removing the trailing shield 200 from the state illustrated in FIG. 21. These drawings illustrate only the structure of the main parts. Further, the numerical references that are the same as those previously indicated are members having substantially similar functions, and an example where the auxiliary pole film 10 is arranged on the trailing side of the main pole film 40 is illustrated in the drawings. As illustrated in FIG. 22, the numerical references 18a and 18b are bonding pads for the recording coil. The numerical references 150a and 150b are bonding pads for the sub-coil respectively. The numerical reference 150 is a substantially ring shaped sub-coil that mostly wraps around the linkage yoke 20a and is wired so as to connect the sub-coil bonding pads 150a and 150b.

The AC in the microwave band modulated preferably for carrying out the recording method of the invention is applied to the sub-coil 150 through the sub-coil bonding pads 150a and 150b. In addition, a cutout part is formed on the ABS of the trailing shield 200 in a corresponding location such that the writing pole part 40A that is the tip end of the main pole film 40 illustrated in FIG. 22 is exposed to the ABS. This is to enable the writing magnetic field to discharge toward the magnetic recording medium from the writing pole part 40A.

In addition, the magnetic head is configured such that the maximum value of the in-plane AC magnetic field is smaller than the maximum value of the perpendicular recording magnetic field. In other words, the magnetic head is preferably configured such that the ratio Hh/Hp between the intensity Hp of the perpendicular magnetic field that is excited by the recording coil film 18 and applied to the recording layer, and the intensity Hh of the in-plane magnetic field that is excited by the sub-coil 150 and applied to the recording layer is 0.1-0.4. The relation in this ratio is a similar to a ratio when the microwave radiator is used as will be described below.

The perpendicular recording magnetic field is a magnetic field that is applied in a substantially perpendicular direction to the lamination surface of the recording layer of the magnetic recording medium. Further, the in-plane AC magnetic field is a magnetic field that is applied in a substantially parallel direction to the surface that is the lamination surface of the recording layer.

The thickness of the sub-coil 150 is preferred to be, for example, 10-50 nm.

Generally, the tip end 40A that is the magnetic air bearing surface of the main pole layer 40 is polished in the manufacturing process of the head. Therefore, in order to prevent the sub-coil 150 from being polished, the tip end of the sub-coil 150 is positioned back approximately 10 nm or more than the tip end of the main pole film 40 in the direction away from the magnetic recording medium.

In FIG. 22, the sub-coil 150 is a single winding; however, the number of windings is not particularly limited. It may be a double or more. Further, in FIG. 22, the sub-coil 150 is a single layer; however, it is not limited to this and it may be a multilayer where two or more layers are stacked. The in-plane AC magnetic field can be increased while suppressing the current that is supplied to the sub-coil 150 by increasing the number of windings and layers of the sub-coil 150.

The operations of the thin film magnetic head provided with the sub-coil 150 to generate a magnetic field in such microwave band are as follows.

In other words, the coil generates a direct-current (DC) magnetic field by supplying the DC to the recording coil film 18 of the recording head. The DC magnetic field is applied to the magnetic recording medium from the writing pole part 40A that is the tip end of the main pole film 40, is passed through the recording layer and the soft magnetic under layer, and is refluxed to the trailing shield 200.

On the other hand, when AC current of the microwave band that is modulated preferably for the present application is applied to the sub-coil 150, an AC magnetic field is generated. Because the AC magnetic field has a high frequency, the AC magnetic field passes through (refluxes in the substantially parallel direction to the surface of the magnetic recording medium, in other words, the in-plane direction to the recording layer of the medium) the surface layer of the magnetic recording medium from the writing pole part 40A that is the tip end of the main pole film 40 to be refluxed to the trailing shield 200.

The recording magnetic field in the perpendicular direction required for perpendicular magnetic recording can be significantly reduced by applying the in-plane AC magnetic field in the microwave band frequency to the recording layer. For example, when comparing to a case in which the in-plane AC magnetic field is not applied, approximately 40% or more of the perpendicular magnetic field that can reverse a magnetization of the recording layer can be reduced by applying the in-plane AC magnetic field, and furthermore, a reduction inasmuch as 60% is possible.

<Configuration of Thin Film Magnetic Head Provide with Microwave Radiator for Radiating Microwaves>

The magnetic head illustrated in FIG. 23-FIG. 27 is a magnetic head provided with a microwave radiator 175 as the microwave assisting technique.

Figure 23:
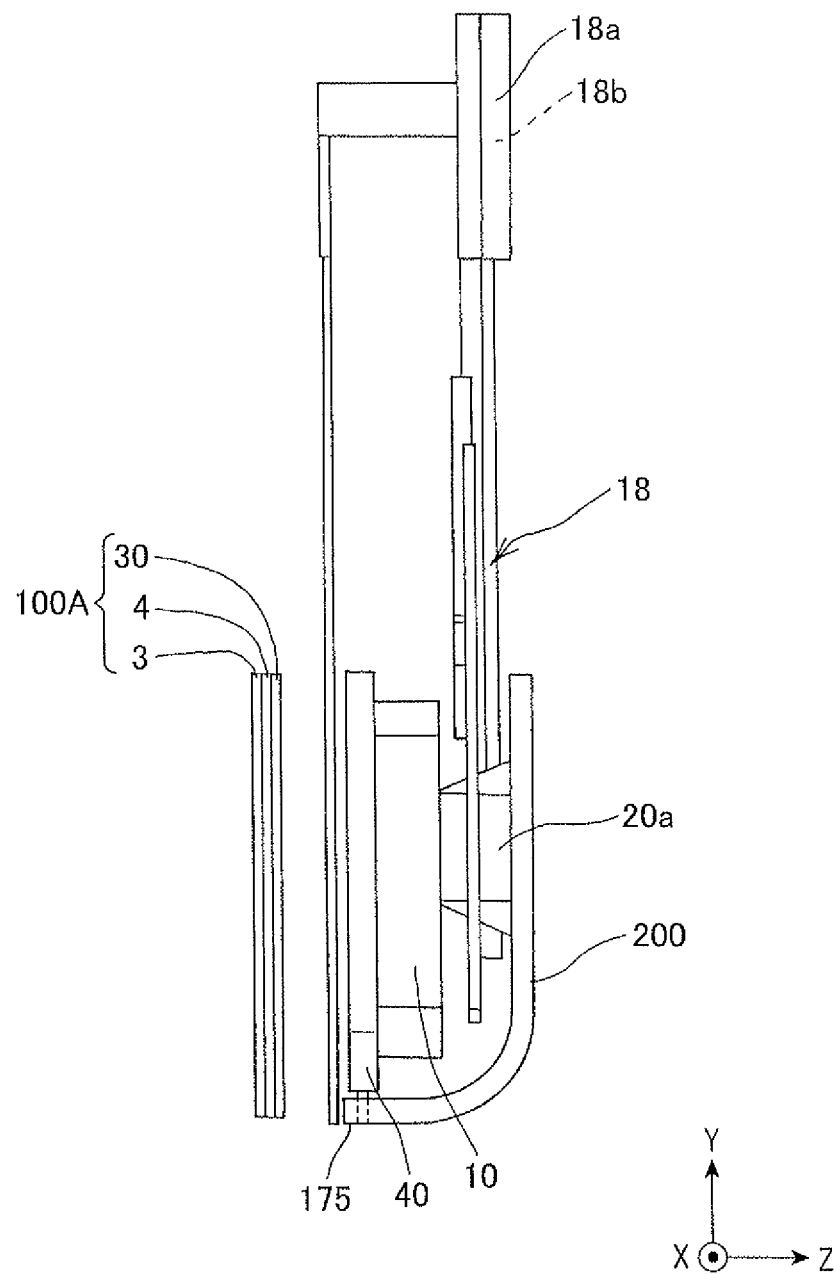
FIG. 23 is a schematic view of a substantial Y-Z plan view that is an illustration of the magnetic head provided with a main pole film and a microwave radiator arranged on the ABS near the front part of the trailing shield that corresponds to the auxiliary pole.

FIG. 23 is a schematic view of a substantial Y-Z plan view that illustrates the magnetic head provided with the main pole film 40, the vicinity of the front (−Z direction) of the trailing shield 200 that corresponds to the auxiliary pole, and the microwave radiator 175 (see FIG. 26 for an enlarged detail view) arranged on the ABS. The in-plane AC magnetic field is generated to the recording layer of the magnetic recording medium by driving the AC current in the microwave band that is modulated preferably for carrying out the recording method of the present invention to the microwave radiator 175. In the following drawings including this drawing, only the structure of the main parts is illustrated.

Figure 24:
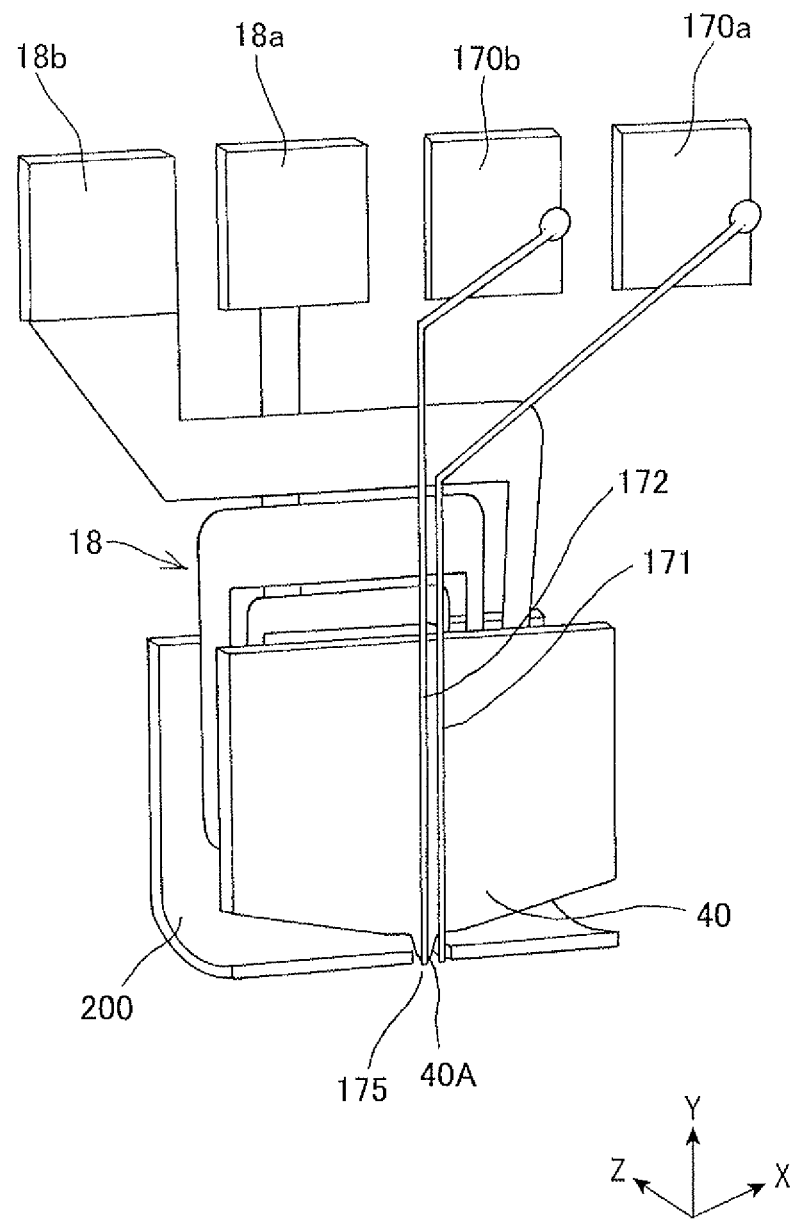
FIG. 24 is a perspective view illustrating a wiring structure that is connected to the microwave radiator so as to provide easily understanding by removing the recording head from the state illustrated in FIG. 23, the view seen the main structure of the internal part of the head from the side of the removed recording head part.

FIG. 24 is a perspective view easily understandably illustrating a wiring structure connected to the microwave radiator 175 by removing the recording head part 100A from the state illustrated in FIG. 23 and viewing the structure of the main parts of the head interior part from the removed recording head part 100A side (viewing the trailing side from the leading side, in other words this drawing is viewed from the substrate side). The numerical references that are the same as those previously indicated are members having a substantially similar function, and in these drawings, an example where the auxiliary pole film 10 is arranged on the trailing side of the main pole film 40 is illustrated.

The microwave radiator 175 configures an inverted microstripline (I-MLIN), and is arranged on the ABS of the recording head part so as to oppose the recording medium. As illustrated in FIG. 24, line conductors 171 and 172 are connected to the microwave radiator 175, and bonding pads 170a and 170b for a microwave radiating body are connected to these line conductors 171 and 172. The AC current in the microwave band that is modulated preferably for carrying out the recording method of the present invention is applied to the bonding pads 170a and 170b for the microwave radiating body.

Figure 25:
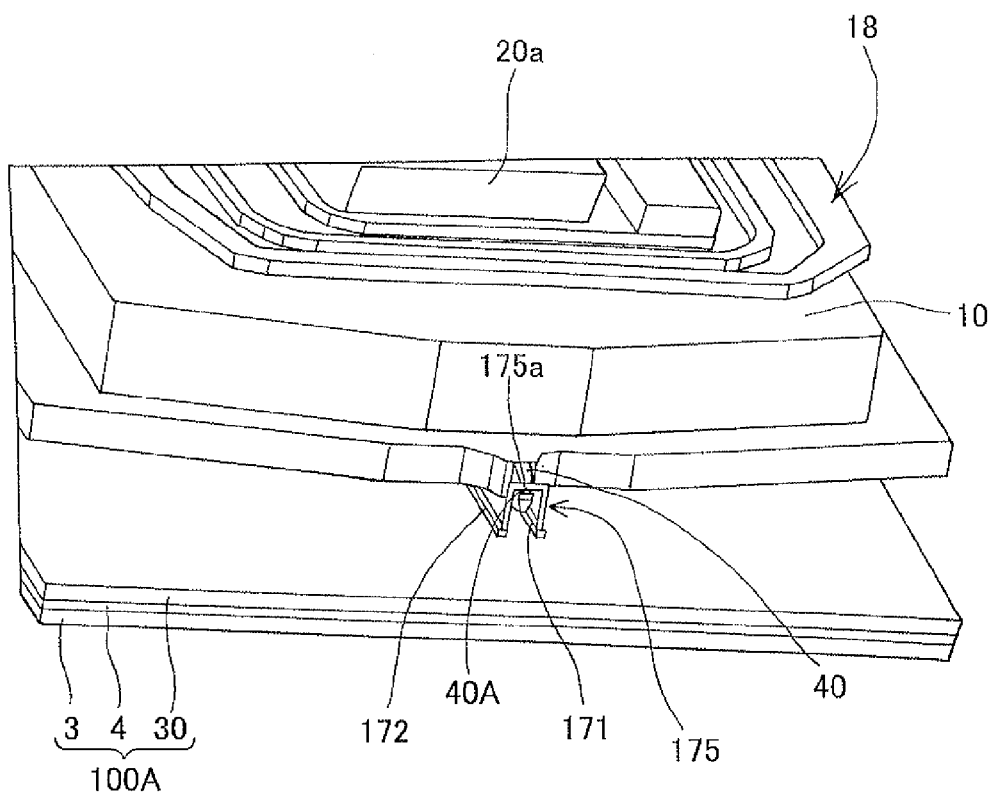
FIG. 25 is a perspective view viewing the ABS side of the thin film magnetic head provided with the microwave radiator for radiating microwaves.

FIG. 25 is a perspective view of the ABS side of the thin film magnetic head provided with the microwave radiator 175 for radiating microwaves. However, FIG. 25 is illustrated in the state where the trailing shield 200 that forms the wrap-around structure is removed for a clear view of the internal structure. The microwave radiator 175 is configured in a U-shape so as to surround the writing pole part 40A. The U-shape may be slanted such that a straight line part 175a that is linked to the U-shape approaches most closely to the magnetic recording medium side. The reason for this is to increase the microwave intensity in the part closest to the substantial recording part of the writing pole part 40A.

Figure 26:
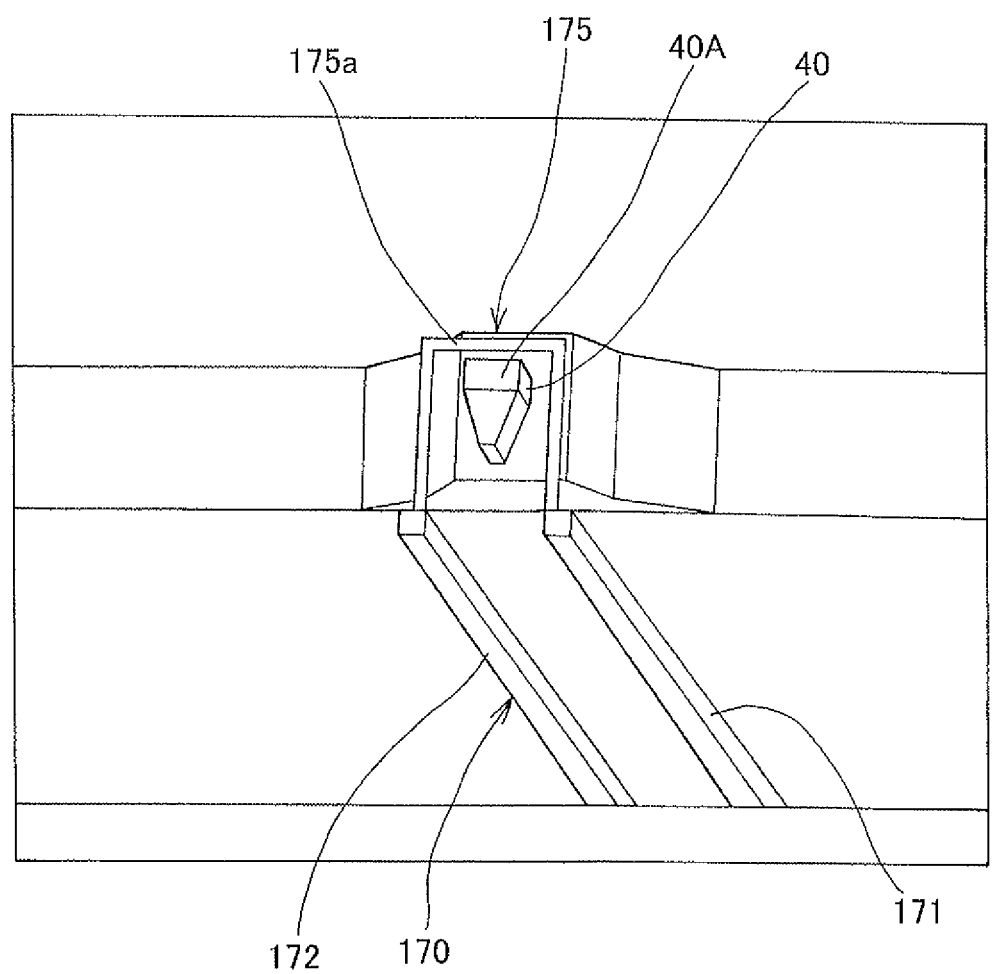
FIG. 26 is a perspective view in which the vicinity of the microwave radiator is further enlarged.
Figure 27:
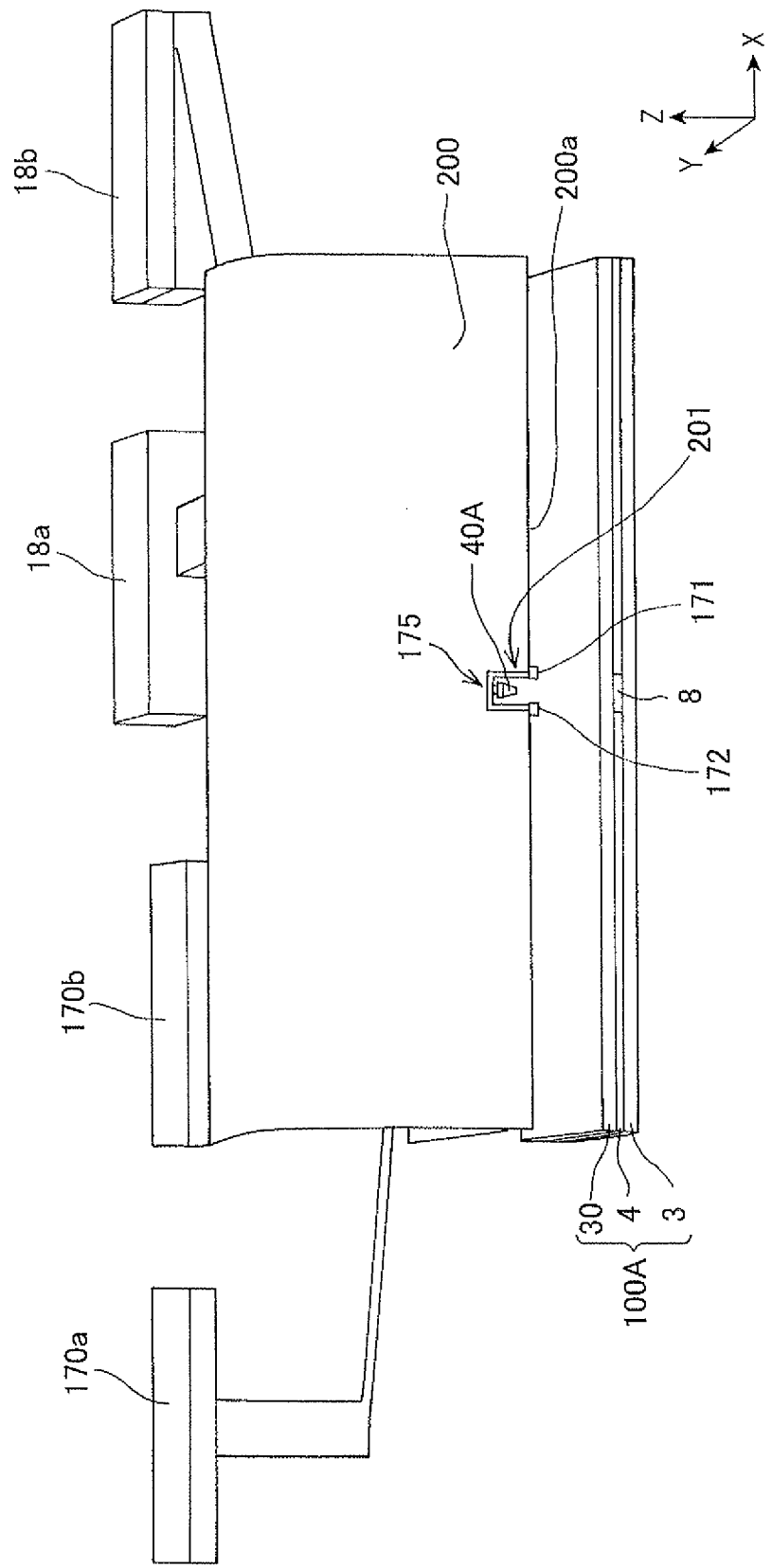
FIG. 27 is a perspective view viewing the ABS side of the thin film magnetic head provided with the microwave radiator for radiating microwaves in the presence of the trailing shield that forms the wrap-around structure.

FIG. 26 is a perspective view in which the vicinity of the microwave radiator 175 in FIG. 25 is further enlarged. FIG. 27 is a perspective view of the ABS side of the thin film magnetic head provided with the microwave radiator for radiating microwaves in the presence of the trailing shield 200 that forms the wrap-around structure. As is evident from FIG. 27, on an end surface 200a of the shield that is the ABS side of the trailing shield 200, a cutout part 201 in, for example, a square shape is formed so that the writing pole part 40A and the microwave radiator 175 that are arranged on the periphery thereof can be exposed to the ABS respectively.

In addition, the microwave radiator 175 is the part that actually realizes the function for radiating microwaves to the magnetic recording medium. In other words, the magnetic recording medium becomes a ground conductor through a space composed of air, and an electric flux line is formed toward the magnetic recording medium from the opposing microwave radiator 175, and thereby, an in-plane high-frequency magnetic field of the magnetic recording medium is generated.

Subsequently, a preferable microwave modulation signal is applied to the microwave radiator 175 so as to realize the recording method of the present invention.

The microwave radiator 175 is configured of a conductive material such as Cu or the like.

Note, simple descriptions will be given regarding the differences in the structures among the inverted microstripline (I-MLIN) used here in the present invention, a stripline that is difficult to be used in the present invention, a microstripline, and a co-planar-waveguide (CPW).

(1) Inverted Microstripline (I-MLIN)

Figure 28:
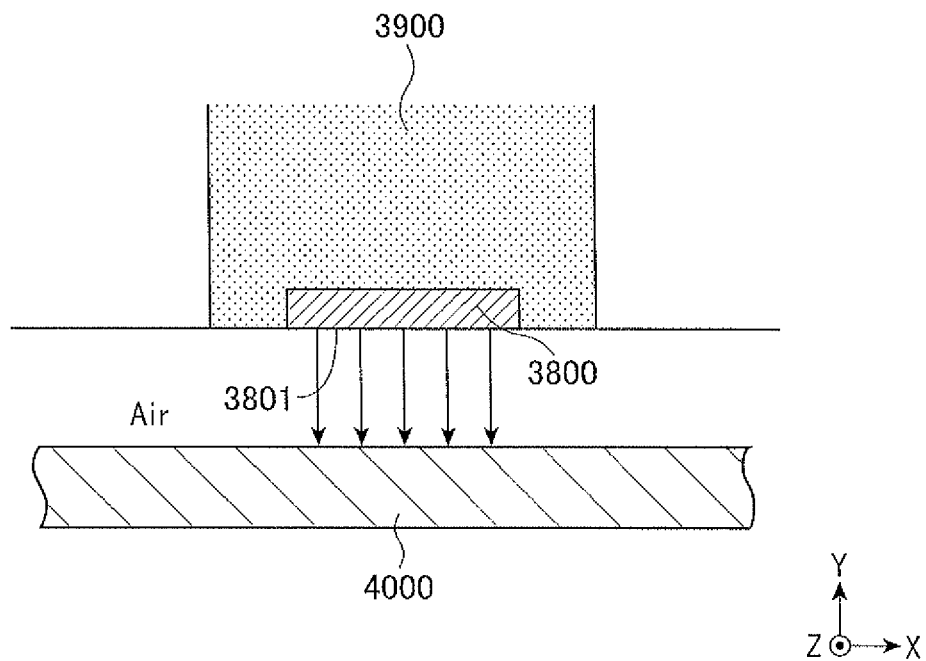
FIG. 28 is a cross-sectional view of a model illustration of the configuration of an inverted microstripline (I-MLIN).

The inverted microstripline (I-MLIN) in a simplified model view is illustrated as FIG. 28, a transmission line path 3800 of the radiator that is the microwave radiating body is embedded on one surface of a dielectric body layer 3900 while an end part surface 3801 is exposed out into the air, and a magnetic recording medium 4000 is oppposingly arranged so as to oppose the end part. The magnetic recording medium functions as the so-called ground conductor, and the electric flux line (indicated by the arrows) is applied toward the magnetic recording medium from the line path radiator that is the microwave radiating body to generate a high-frequency magnetic field in the perpendicular direction to the electric flux line. The so-called in-plane high-frequency magnetic field is applied to the magnetic recording medium. In addition, the transmission line path 3800 does not need to be partially embedded, and may also be formed on the dielectric body layer 3900.

(2) Stripline

Figure 29:
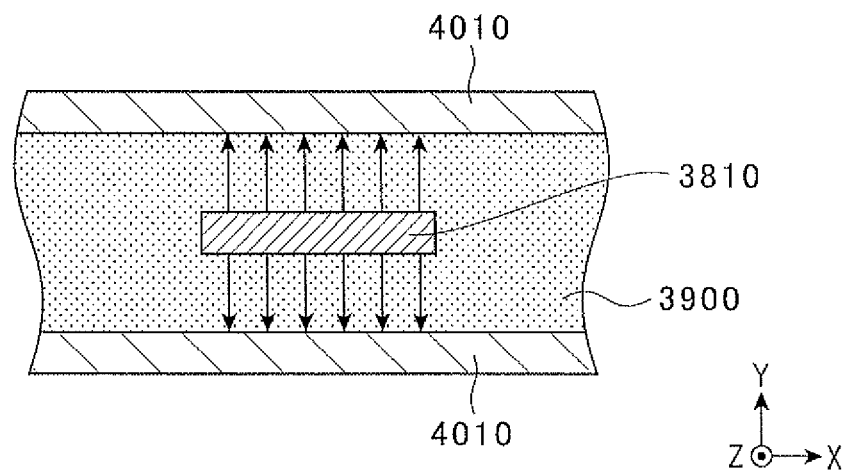
FIG. 29 is a cross-sectional view of a model illustration of the stripline configuration.

As illustrated in FIG. 29, a transmission line path 3810 is completely embedded within the dielectric body layer 3900, and ground conductors 4010 are respectively arranged upper and lower sides of the transmission line path 3810 with the dielectric body layer 3900 therebetween. An electric flux line (indicated by the arrows) is applied toward the upper and lower ground conductors 4010 respectively from the radiator of the transmission line path 3810 that is the microwave radiating body, thereby generating a magnetic field in the perpendicular direction to the electric flux line.

(3) Microstripline

Figure 30:
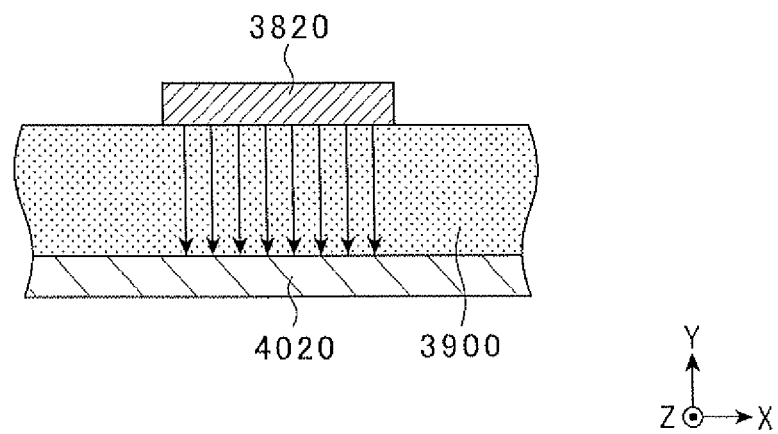
FIG. 30 is a cross-sectional view of a model illustration of the microstripline configuration.

As illustrated in FIG. 30, the dielectric body layer 3900 is formed on a ground conductor 4020, and a transmission line path 3820 that is the microwave radiating body is formed thereupon. In this case, an electric flux line (indicated by the arrows) from the transmission line path 3820 is applied toward the ground conductor 4020 with the dielectric body layer 3900 therebetween, thereby generating a magnetic field in the perpendicular direction to the electric flux line.

(4) CPW (Co-Planer-Waveguide)

Figure 31:
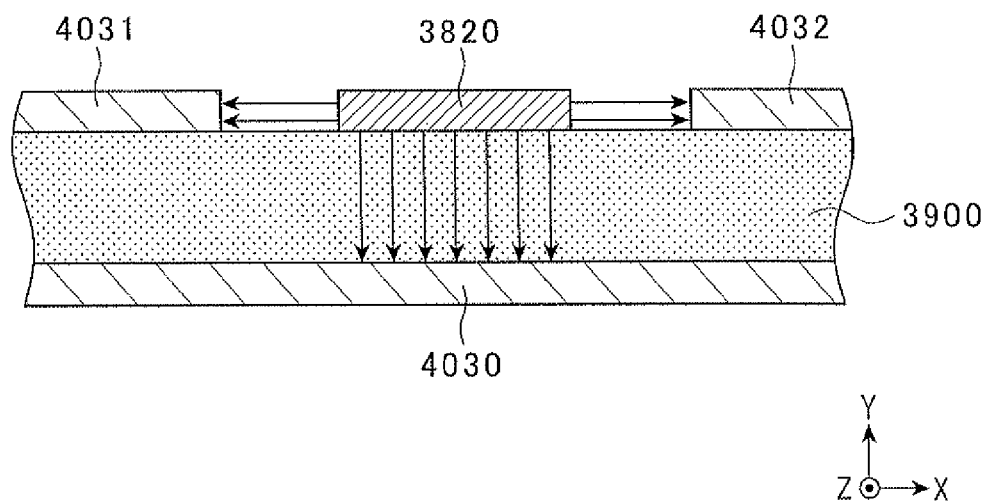
FIG. 31 is a cross-sectional view of a model illustration of the configuration of a co-planer-waveguide (CPW).
Figure 32:
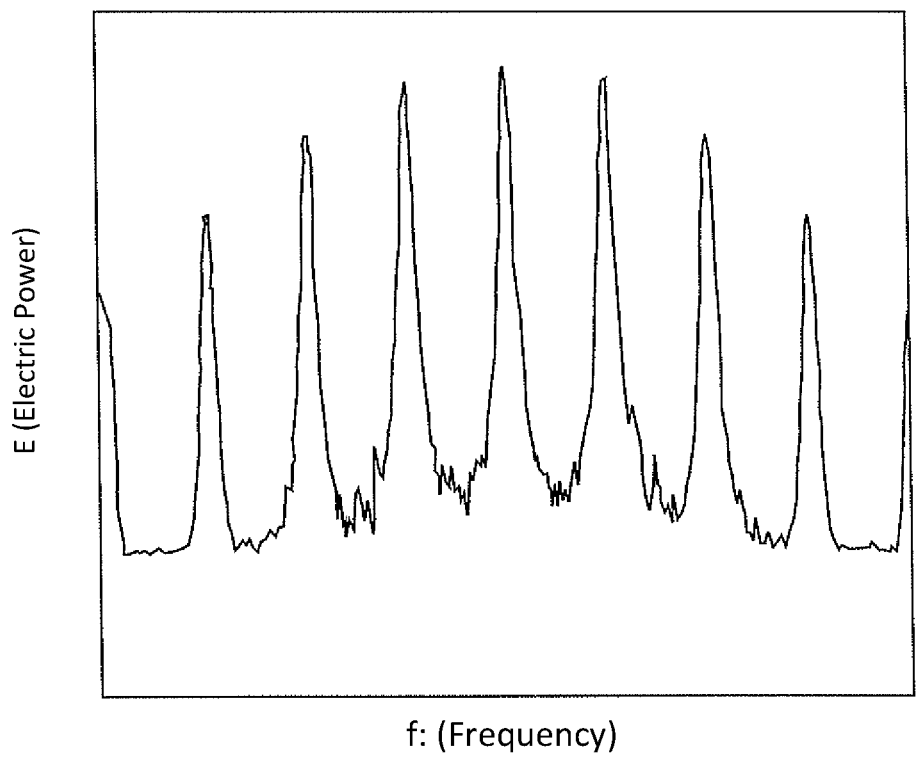
FIG. 32 is a schematic illustration of a spectrum by a conventional modulation system.

As illustrated in FIG. 31, the dielectric body layer 3900 is formed on a ground conductor 4030, and the transmission line path 3820 that is the microwave radiating body is formed thereupon so as to expose the end part. Further, a pair of ground conductors 4031 and 4032 is disposed also on the dielectric body layer of both left and right end parts of the transmission line 3820 in the drawing. In this case, an electric flux line (indicated by the arrows) from the line 3820 is applied toward the ground conductor 4030 with the dielectric body layer 3900 therebetween and is also applied toward the pair of ground conductors 4031 and 4032 on the left and right respectively from the both end parts of the transmission line 3820, thereby generating a magnetic field in the perpendicular direction to each of these electric flux lines.

In addition, the one illustrated in FIG. 31 is referred to as a lower surface ground type co-planer-waveguide, and there are also types in which there is no lower surface ground conductor 4030 (common co-planer-waveguide).

When the magnetic recording method of the present invention described above is carried out by using the microwave assisted head as described above, spin precession movement of the magnetic nanoparticles configuring the inside of the recording layer of the magnetic recording medium is excited to carry out magnetization reversal efficiently even in uniformly both the lower and higher frequency regions than the ferromagnetic resonant (FMR) frequency, thereby realizing a high assistance effect. In other words, according to the present invention, the relation between the magnetization reversal probability and the frequency can be substantially flat, and an extremely flexible response can be made for changes and variations of microwave center frequency to apply as well as for changes and variations in the ferromagnetic resonant (FMR) frequency of the recording layer of the magnetic recording medium.

The configuration is made in which one of the terminals that are connected to the sub-coil or the microwave radiator is connected to the microwave SS signal source, and the other terminal on the opposite side has a ground electrical potential. Or, the configuration may be made in which one terminal of the terminals that are connected to the sub-coil or the microwave radiator is connected to the microwave SS signal source, and the other terminal has a ground electrical potential connected to a similar signal source in which the phase is 180 degree different from the microwave SS signal source.

What is claimed is:

1. A magnetic recording method that perform magnetic recording to a recording layer of a magnetic recording medium that is arranged opposed to a thin film magnetic head using a thin film magnetic head, the thin film magnetic head including a main pole, an auxiliary pole, a writing coil for generating a writing magnetic field to the main pole, and either a sub-coil that is arranged between the main pole and the auxiliary pole for generating a magnetic field in a microwave band into an in-plane direction of the magnetic recording medium or a microwave radiator that is provided adjacent to the main pole for radiating microwaves,
the method comprising:
applying a microwave spread spectrum signal (SS signal) to either the sub-coil or the microwave radiator, the microwave SS signal including a ferromagnetic resonant (FMR) frequency of the recording layer as a carrier wave within a band so as to generate an in-plane high-frequency magnetic field so that a magnetization reversal magnetic field Hsw of the recording layer is lowered; and
performing the magnetic recording while the magnetization reversal magnetic field Hsw of the recording layer is lowered.

2. The magnetic recording method according to claim 1, wherein
a frequency spectrum of the microwave SS signal is:
configured to increase signal intensity at 3 dB±1 dB/Oct in a frequency range that is on a lower side than the FMR frequency of the recording layer of the magnetic recording medium; and
configured to increase signal intensity at 12 dB±2 dB/Oct in a frequency range that is on a higher side than the FMR frequency.

3. The magnetic recording method according to claim 1, wherein
a frequency spectrum of the microwave SS signal is:
adjusted by a low-pass filter of which a cutoff frequency is the FMR frequency and of which a frequency property is 3 dB±1 dB/Oct on a lower range side than the FMR frequency in order to increase signal intensity at 3 dB±1 dB/Oct in a frequency range on a lower side than the FMR frequency of the recording layer of the magnetic recording medium; and
adjusted by a high-pass filter of which a frequency property is 12 dB±2 dB/Oct on a higher range side than the FMR frequency in order to increase signal intensity at 12 dB±2 dB/Oct in a frequency range on a higher side than the FMR frequency.

4. The magnetic recording method according to claim 1, wherein
a frequency spectrum of the microwave SS signal is adjusted by a band-elimination filter,
the band-elimination filter having a frequency property that increases signal intensity at 3 dB±1 dB/Oct in a frequency range on a lower side than the FMR frequency and that increases signal intensity at 12 dB±2 dB/Oct in a frequency range on a higher side than the FMR frequency; and
a center frequency of the band-elimination filter being the FMR frequency.

5. The magnetic recording method according to claim 1, wherein
the microwave SS signal is formed where a carrier wave that is the FMR frequency of the recording layer of the magnetic recording medium is phase-modulated by a modulation signal due to white noise, and its modulation degree is 0 (0 is not included)-$2\pi$ ($2\pi$ is not included) radian.

6. The magnetic recording method according claim 1, wherein
the microwave SS signal is formed where a carrier wave that is the FMR frequency of the recording layer of the magnetic recording medium is phase-modulated by a modulation signal due to a pseudo noise signal, and its modulation degree is 0 (0 is not included)-$2\pi$ ($2\pi$ is not included) radian.

7. The magnetic recording method according to claim 1, wherein
at the same time as a recording magnetic field is applied in a perpendicular direction to a film surface of the recording layer of the magnetic recording medium from the main pole, the microwave SS signal containing the FMR frequency of the recording layer as a carrier wave within the band is applied to either the sub-coil or the microwave radiator, and
a high-frequency magnetic field is applied in an in-plane direction of the recording layer of the magnetic recording medium, thereby the magnetic recording is performed by magnetization reversal.

8. The magnetic recording method according to claim 1, wherein
the FMR frequency of the recording layer that is selected as a carrier wave is in the range of 10-20 GHz.

9. The magnetic recording method according to claim 1, wherein
one of terminals that are linked to either the sub-coil or the microwave radiator is connected to a microwave spread spectrum signal source, and
the other terminal on the opposite side has a ground potential.

10. The magnetic recording method according to claim 1, wherein
one of terminals that are linked to either the sub-coil or the microwave radiator is connected to a microwave spread spectrum signal source, and
the other terminal on the opposite side is connected to a similar signal source of which a phase is 180 degree different from the microwave SS signal source.

11. The magnetic recording method according to claim 1, wherein
a ratio between intensities Hh/Hp is 0.1-0.4, the intensity Hp of a perpendicular magnetic field being excited by the writing coil and applied to the recording layer, and the intensity Hh of an in-plane magnetic field being excited by either the sub-coil or the microwave radiator and applied to the recording layer.

* * * * *